(12) United States Patent
Kamo et al.

(10) Patent No.: US 12,496,673 B2
(45) Date of Patent: Dec. 16, 2025

(54) MACHINE TOOL AND METHOD OF DECIDING TOOL MOVING PATH

(71) Applicant: Star Micronics Co., Ltd., Shizuoka (JP)

(72) Inventors: Shotaro Kamo, Shizuoka (JP); Katsuhiro Shinomiya, Shizuoka (JP)

(73) Assignee: STAR MICRONICS CO., LTD., Shizuoka (JP)

( * ) Notice: Subject to any disclaimer, the term of this patent is extended or adjusted under 35 U.S.C. 154(b) by 399 days.

(21) Appl. No.: 17/959,814

(22) Filed: Oct. 4, 2022

(65) Prior Publication Data

US 2023/0115138 A1    Apr. 13, 2023

(30) Foreign Application Priority Data

Oct. 8, 2021    (JP) .................................. 2021-166296

(51) Int. Cl.
*B23Q 15/12*    (2006.01)

(52) U.S. Cl.
CPC .................................. *B23Q 15/12* (2013.01)

(58) Field of Classification Search
None
See application file for complete search history.

(56) References Cited

U.S. PATENT DOCUMENTS

| | | |
|---|---|---|
| 5,713,253 A | 2/1998 | Date |
| 2018/0369920 A1 | 12/2018 | Takahashi |
| 2021/0121995 A1* | 4/2021 | Hykes ..................... B24B 5/307 |
| 2021/0382455 A1 | 12/2021 | Sagasaki et al. |
| 2023/0244206 A1* | 8/2023 | Bretschneider .. G05B 19/40938 700/160 |
| 2024/0377801 A1 | 11/2024 | Sagasaki et al. |

FOREIGN PATENT DOCUMENTS

| | | |
|---|---|---|
| CN | 108367362 A | 8/2018 |
| DE | 69933644 T2 | 8/2007 |
| EP | 1028362 B1 | 10/2006 |

(Continued)

OTHER PUBLICATIONS

Office Action for its corresponding Japan application (application No. 2021-166296) with English Translation dated Apr. 24, 2025.

(Continued)

*Primary Examiner* — Ryan A Jarrett
(74) *Attorney, Agent, or Firm* — MUNCY, GEISSLER, OLDS & LOWE, P.C.

(57) ABSTRACT

A controller of a machine tool acquires coordinates of a first machining start point of an eccentric shape in a reference phase of a workpiece around a spindle axis, a second machining start point in an anti-phase, a first machining end point in the reference phase, and a second machining end point in the anti-phase. The controller decides a moving path of the tool in association with rotation of the workpiece at least according to the coordinates of the first start point, the second start point, the first end point, and the second end point to form the eccentric shape around an eccentric axis passing a start point origin between the first start point and the second start point and an end point origin between the first end point and the second end point and thereby controls movement of the tool in association with rotation of the workpiece.

11 Claims, 9 Drawing Sheets

(56) References Cited

FOREIGN PATENT DOCUMENTS

| EP | 3913447 A1 | 11/2021 |
|---|---|---|
| JP | H04331038 A | 11/1992 |
| JP | 2021140819 A | 9/2021 |
| WO | WO2017/086238 A1 | 5/2017 |

OTHER PUBLICATIONS

Japanese Office Action in application No. 2021-166296 dated Aug. 5, 2025; pp. 1-10.

\* cited by examiner

MACHINE TOOL AND METHOD OF DECIDING TOOL MOVING PATH

CROSS-REFERENCE TO RELATED APPLICATIONS

This application claims priority of Japanese Patent Application No. 2021-166296 filed on Oct. 8, 2021. The contents of this application are incorporated herein by reference in their entirety.

BACKGROUND OF THE INVENTION

The present invention relates to a machine tool capable of forming an eccentric shape on a workpiece and a method of deciding a tool moving path.

The machine tool includes a well-known NC (numerically control) lathe provided with a spindle and a tool post. The NC lathe controls machining the workpiece rotatably held by the spindle with a tool attached to the tool post. The lathe controls forming a columnar shape on the workpiece around a spindle axis by applying a turning tool from outside on the rotating workpiece while maintaining a positional relationship of an edge of the turning tool with respect to the spindle axis on an X-Y plane perpendicular to the spindle axis. The lathe controls forming an eccentric shape on the workpiece by controlling rotational movement of the edge of the turning tool in association with rotation of the workpiece on the X-Y plane.

The NC lathe disclosed in Unexamined International Publications No. 2017-086238 controls forming an eccentric shape on the workpiece by receiving an input of an eccentric distance (D) and a radius (R) of the eccentric shape, setting an imaginary circle of a radius corresponding to the distance D, setting an offset imaginary circle whose center deviates from the center of the workpiece by the radius R in the direction of the radius of the workpiece, and then moving the edge of the turning tool in association with rotation of the workpiece along the circumference of the offset imaginary circle. The lathe controls forming a convex columnar shape around an eccentric axis parallel to the spindle axis.

SUMMARY

The conventional NC lathe forms an eccentric shape of a certain radius around a an axis parallel to the spindle axis. Restriction on freedom in eccentric shape forming would deteriorate convenience of the NC lathe. Such problem resides in a variety of machine tool including a machining center.

The present invention discloses a technology capable of improving freedom in eccentric shape forming.

A machine tool of the invention includes: a spindle rotatable together with a workpiece around a spindle axis; a tool post holding a tool for use to machine the workpiece; a driver capable of varying a positional relationship between the spindle and the tool post; and a controller capable of controlling the driver to form an eccentric shape on the workpiece around an eccentric axis deviating from the spindle axis. The controller acquires a coordinate of a first machining start point of the eccentric shape in a reference phase of the workpiece around the spindle axis, a coordinate of a second machining start point of the eccentric shape in an anti-phase different from the reference phase by 180 degrees, a coordinate of a first machining end point of the eccentric shape in the reference phase, and a coordinate of a second machining end point of the eccentric shape in the anti-phase. The controller decides a moving path of the tool in association with rotation of the workpiece at least according to the coordinates of the first machining start point, the second machining start point, the first machining end point, and the second machining end point to form the eccentric shape around the eccentric axis passing a start point origin between the first machining start point and the second machining start point and an end point origin between the first machining end point and the second machining end point. The controller controls movement of the tool in association with rotation of the workpiece along the moving path.

A method of deciding a tool moving path for a machine tool comprising a spindle rotatable together with a workpiece around a spindle axis and a tool post holding a tool for use to machine the workpiece and being capable of varying a positional relationship between the spindle and the tool post to form an eccentric shape on the workpiece around an eccentric axis deviating from the spindle axis includes: acquiring a coordinate of a first machining start point of the eccentric shape in a reference phase of the workpiece around the spindle axis, a coordinate of a second machining start point of the eccentric shape in an anti-phase different from the reference phase by 180 degrees, a coordinate of a first machining end point of the eccentric shape in the reference phase, and a coordinate of a second machining end point of the eccentric shape in the anti-phase, and deciding a moving path of the tool in association with rotation of the workpiece at least according to the coordinates of the first machining start point, the second machining start point, the first machining end point, and the second machining end point to thereby form the eccentric shape around the eccentric axis passing a start point origin between the first machining start point and the second machining start point and an end point origin between the first machining end point and the second machining end point.

The invention can provide a technology capable of improving freedom in eccentric shape forming.

DETAILED DESCRIPTION

Figure 1:
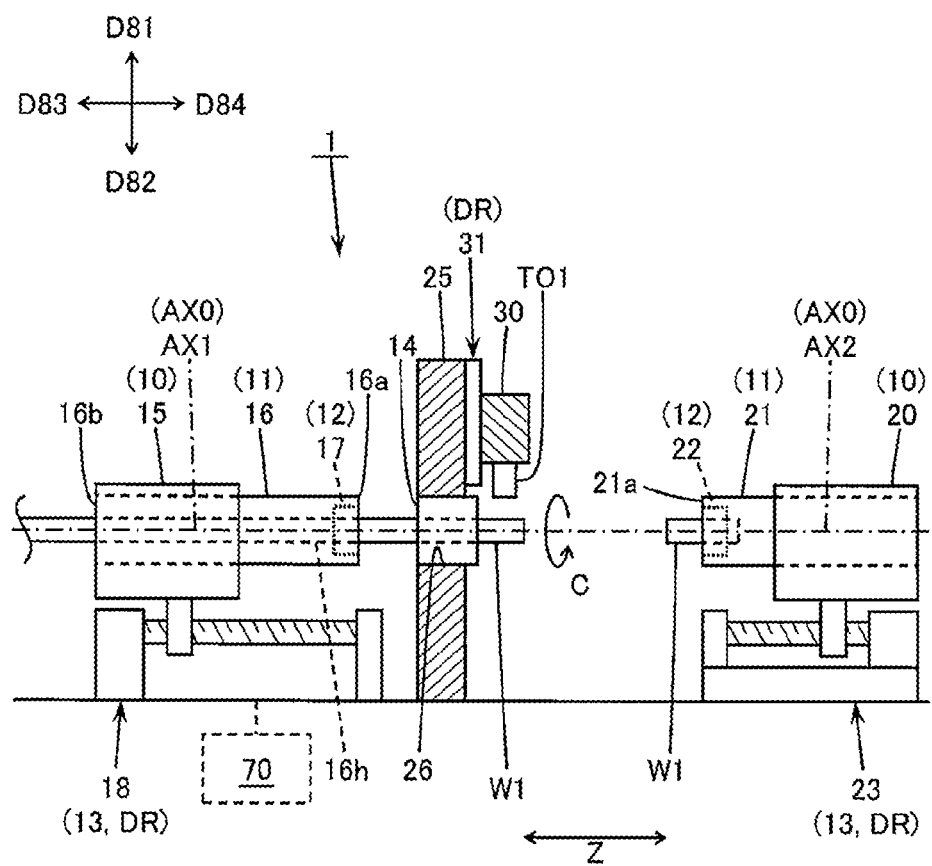
FIG. 1 is a front view schematically showing an exemplary configuration of a machine tool.

Hereinafter, an embodiment of the present invention will be described referring to the drawings. The invention is not limited to the exemplary embodiments. The features disclosed herein are not necessarily essential to the invention.

(1) Summary of Technology in Scope of the Invention

Technology of the invention is being described with reference to FIG. 1 to FIG. 8. The drawings only schematically show an example of the invention. They may have a mismatch to each other due to different magnification in each direction. Each element of the technology is not limited to the element denoted by a symbol in the embodiment.

Embodiment 1

Figure 2:
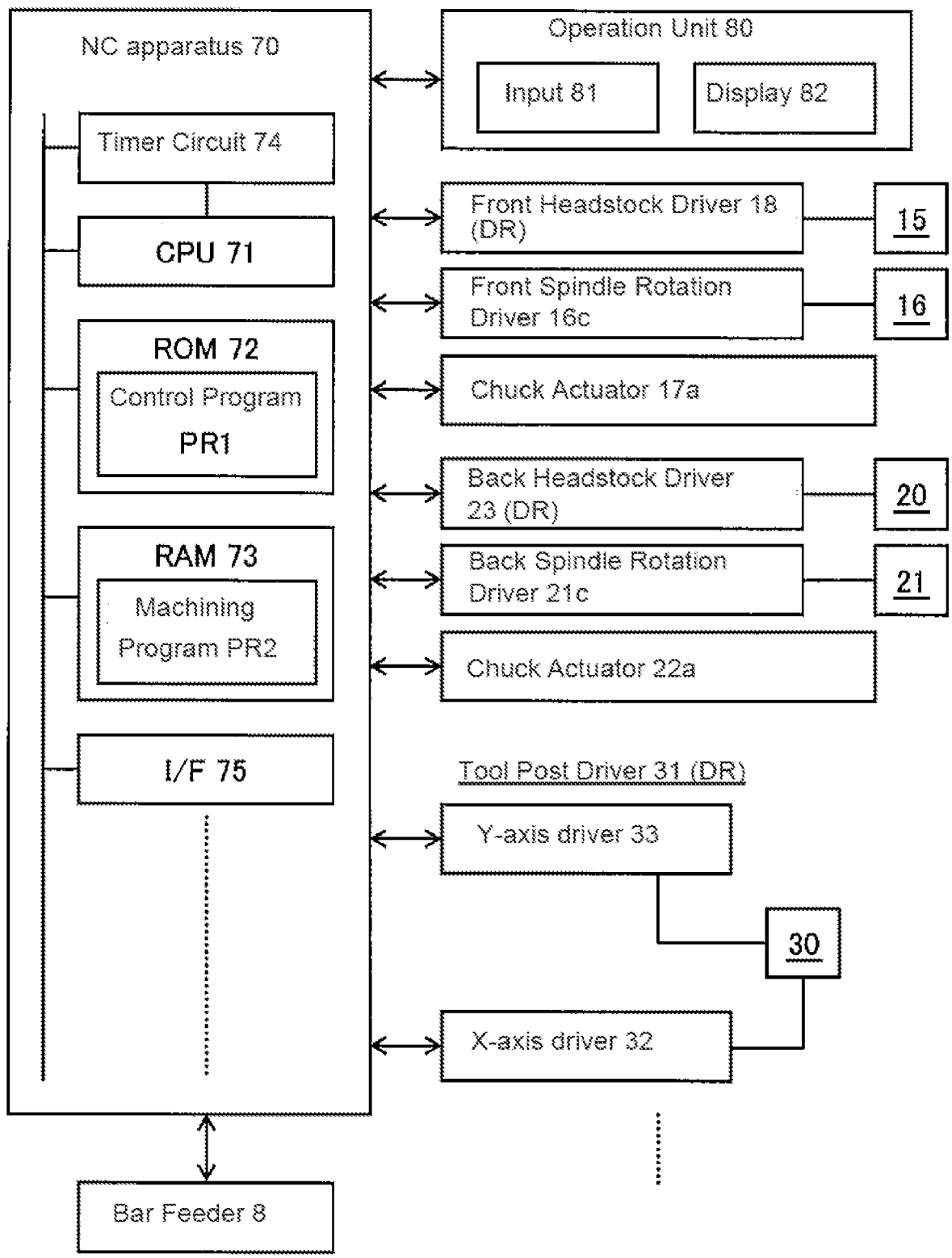
FIG. 2 is a block diagram schematically showing an exemplary configuration of an electrical circuit of the machine tool.

As shown in FIG. 1 and FIG. 2, a machine tool (for example, a lathe 1) of an embodiment of the invention may include a spindle 11, a tool post 30, a driving unit DR, and a controller (for example, an NC apparatus 70). The spindle 11 holding a workpiece W1 may rotate around a spindle axis AX0. A tool TO1 may be attached to the tool post 30 to be available to machine the workpiece W1. The driving unit DR may vary a positional relationship between the spindle 11 and the tool post 30. The controller (70) may control the driving unit DR to vary the positional relationship between the spindle 11 and the tool post 30 to thereby form an eccentric shape (for example, a protrusion W1p) on the workpiece W1 around an eccentric axis AX3 deviating from the spindle axis AX0 as shown in FIG. 3 to FIG. 7. The controller (70) may acquire a coordinate of a first machining start point SpA of the eccentric shape (W1p) in a reference phase (for example, θ=0°) of the workpiece W1 around the spindle axis AX0, a coordinate of a second machining start point SpB of the eccentric shape (W1p) in an anti-phase (for example, θ=180°) different from the reference phase by 180 degrees, a coordinate of a first machining end point EpA of the eccentric shape (W1p) in the reference phase (for example, θ=0°), and a coordinate of a second machining end point EpB of the eccentric shape (W1p) in the anti-phase (for example, θ=180°). The controller (70) may decide a moving path (for example, an imaginary circle C1) of the tool TO1 in association with rotation of the workpiece W1 at least according to the coordinates of the first start point SpA, the second start point SpB, the first end point EpA, and the second end point EpB. The controller (70) may thereby control forming the eccentric shape (W1p) around the eccentric axis AX3 passing both a start point origin SpO and an end point origin EpO. The start point origin SpO may be a middle point between the first start point SpA and the second start point SpB. The end point origin EpO may be a middle point between the first end point EpA and the second end point EpB. The controller (70) may control movement of the tool TO1 along the moving path (C1) in association with rotation of the workpiece W1.

The distance between the first start point SpA and the second start point SpB may be different from the distance between the first end point EpA and the second end point EpB on the X-Y plane perpendicular to the spindle axis AX0 to form the tapered eccentric shape (W1p) on the workpiece W1. X and Y coordinates of the start point origin SpO may be different from X and Y coordinates of the end point origin EpO to form the eccentric shape (W1p) around the eccentric axis AX3 unparallel to the spindle axis AX0. The eccentric shape (W1p) formed on the workpiece W1 in the embodiment may have variety in addition to the conventional eccentric shape of a constant radius around the axis parallel to the spindle axis AX0. The embodiment can provide a machine tool capable of improving freedom in eccentric shape forming.

The driving unit may drive the tool post to vary the positional relationship between the spindle and the tool post. The driving unit may drive the spindle to vary the positional relationship between the spindle and the tool post. The driving unit may drive both the tool post and the spindle to vary the positional relationship between the spindle and the tool post. The eccentric shape may include any shape including a protrusion and a hole. The controller may acquire one or more parameters in addition to the coordinates of the four points (SpA, SpB, EpA, EpB). The parameter may include a feed pitch of the workpiece in a Z-axis direction along the spindle axis, a spindle rotation angle as a unit for deciding the tool moving path, and a circumferential speed of the rotating workpiece. The controller may decide the tool moving path according to the coordinates of the four points (SpA, SpB, EpA, EpB) and one or more other parameters. The words "first" and "second" only identify each of plural similar elements and does not mean any order of the plural similar elements. The remarks may apply to the following embodiments.

Embodiment 2

As shown in FIG. 3 to FIG. 8, the controller (70) may calculate a diameter (SpD) of the eccentric shape (W1p) in a direction perpendicular to the spindle axis AX0 according to the coordinates of the first start point SpA and the second start point SpB. The controller (70) may calculate a diameter (EpD) of the eccentric shape (W1p) in a direction perpendicular to the spindle axis AX0 according to the coordinates of the first end point EpA and the second end point EpB. The controller (70) may interpolate a diameter (WpD) of the eccentric shape (W1p) at a halfway point origin WpO according to the diameter (SpD) and the diameter (EpD). The halfway point origin WpO may be a middle point between the start point origin SpO and the end point origin EpO on the eccentric axis AX3. The controller (70) may decide the moving path of the tool TO1 along the circumference of an imaginary circular arc (C1) around a circular arc center WpC deviating from the spindle axis AX0 according to the diameter (WpD).

The diameter (SpD) of the eccentric shape (W1p) at a machining start section thereof may be different from the diameter (EpD) of the eccentric shape (W1p) at a machining end section thereof to form the tapered eccentric shape (W1p) on the workpiece W1. The embodiment can provide a machine tool capable of improving freedom in eccentric shape forming. The imaginary circular arc may conceptually include an imaginary circle assuming the spindle rotation angle of 360 degrees. The circumference of the imaginary circular arc may conceptually include a circumference of the imaginary circle. The above remarks may be applied to the following embodiments.

Embodiment 3

As shown in FIG. 3 to FIG. 8, the controller (70) may calculate an eccentric amount (SpE) of the start point origin SpO deviating from the spindle axis AX0 according to the coordinates of the first start point SpA and the second start point SpB. The controller (70) may calculate an eccentric amount (EpE) of the end point origin EpO deviating from the spindle axis AX0 according to the coordinates of the first end point EpA and the second end point EpB. The controller (70) may interpolate an eccentric amount (WpE) of the halfway point origin WpO according to the eccentric amount (SpE) and the eccentric amount (EpE). The halfway point origin WpO may be the middle point between the start point origin SpO and the end point origin EpO on the eccentric axis AX3. The controller (70) may decide the moving path of the tool TO1 along the circumference of the imaginary circular arc (C1) of a size corresponding to the eccentric amount (WpE).

The eccentric amount (SpE) of the start point origin SpO may be different from the eccentric amount (EpE) of the end point origin EpO to form the eccentric shape (W1$p$) around the eccentric axis AX3 unparallel to the spindle axis AX0. The embodiment can provide a machine tool capable of improving freedom in eccentric shape forming.

Embodiment 4

Figure 7:
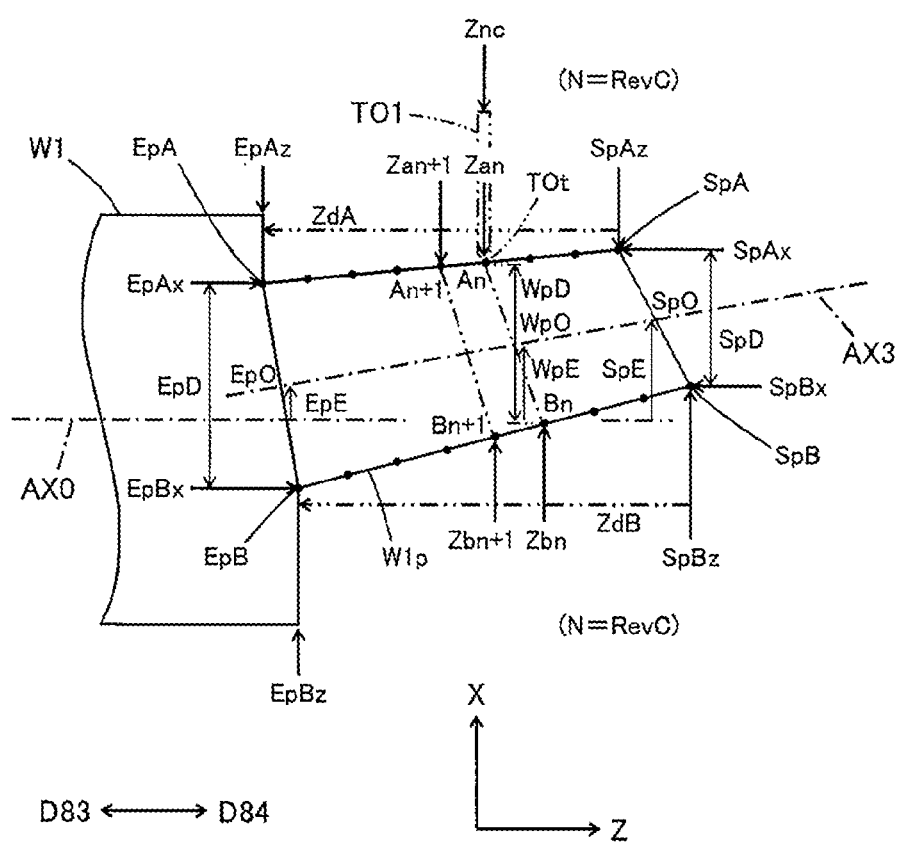
FIG. 7 schematically shows how a relative position of the tool is decided to form the tapered eccentric shape whose machining start section and machining end section are angled with respect to the X-Y plane.

The coordinates of the first start point SpA, the second start point SpB, the first end point EpA, and the second end point EpB may respectively include Z-coordinates, which is a coordinate on the Z-axis along the spindle axis AX0. As shown in FIG. 7, on a first outline connecting the first start point SpA and the first end point EpA (for example, on a first line segment SpA-EpA), the controller (70) may control the driving unit DR to vary the positional relationship between the spindle 11 and the tool post 30 with respect to the Z-axis each time the workpiece W1 rotates on the spindle axis AX0 by an amount obtained by dividing the difference of the Z-coordinates between the first start point SpA and the first end point EpA (for example, a moving amount ZdA) by the number of divisions N. On a second outline connecting the second start point SpB and the second end point EpB (for example, on a second line segment SpB-EpB), the controller (70) may control the driving unit DR to vary the positional relationship between the spindle 11 and the tool post 30 with respect to the Z-axis each time the workpiece W1 rotates on the spindle axis AX0 by an amount obtained by dividing the difference of the Z-coordinates between the second start point SpB and the second end point EpB (for example, a moving amount ZdB) by the number of divisions N. For example, as shown in FIG. 7, on the first line segment SpA-EpA, the controller (70) may control the driving unit DR to vary the positional relationship between the spindle 11 and the tool post 30 with respect to the Z-axis each time the workpiece W1 rotates on the spindle axis AX0 by an amount obtained by dividing the length of the first line segment SpA-EpA by the number of divisions N. On the second line segment SpB-EpB, the controller (70) may control the driving unit DR to vary the positional relationship between the spindle 11 and the tool post 30 with respect to the Z-axis each time the workpiece W1 rotates on the spindle axis AX0 by an amount obtained by dividing the length of the second line segment SpB-EpB by the number of divisions N.

The difference of the Z-coordinates between the first start point SpA and the first end point EpA may be different from the difference of the Z-coordinates between the second start point SpB and the second end point EpB to form the eccentric shape (W1$p$) on the workpiece W1. The embodiment can provide a machine tool capable of improving freedom in eccentric shape forming. The first outline and the second outline may include a straight line and a curved line. The remarks may be applied to the following embodiments.

Embodiment 5

As shown in FIG. 1 and FIG. 2, the driving unit DR may include a tool post driver 31 capable of moving the tool post 30 along an X-axis and a Y-axis perpendicular to each other and perpendicular to the Z-axis, and a headstock driver 13 capable of moving the spindle 11 along the Z-axis. The controller (70) may control movement of the tool TO1 in association with rotation of the workpiece W1 along the X-axis and the Y-axis and control vibration of the workpiece W1 in association with rotation of the workpiece W1 along the Z-axis to thereby vibrate the positional relationship between the spindle 11 and the tool post 30 with respect to the Z-axis in association with rotation of the workpiece W1. In a lathe where the tool post 30 does not move along the Z-axis, the controller (70) may control vibration of the workpiece W1 in association with rotation of the workpiece W1 along the Z-axis to form the eccentric shape (W1$p$) on the workpiece W1 regardless of a difference of the Z-coordinates between the first start point SpA and the first end point EpA and regardless of a difference of the Z-coordinates between the second start point SpB and the second end point EpB. The embodiment can provide a machine tool capable of improving freedom in eccentric shape forming.

Embodiment 6

Figure 9:
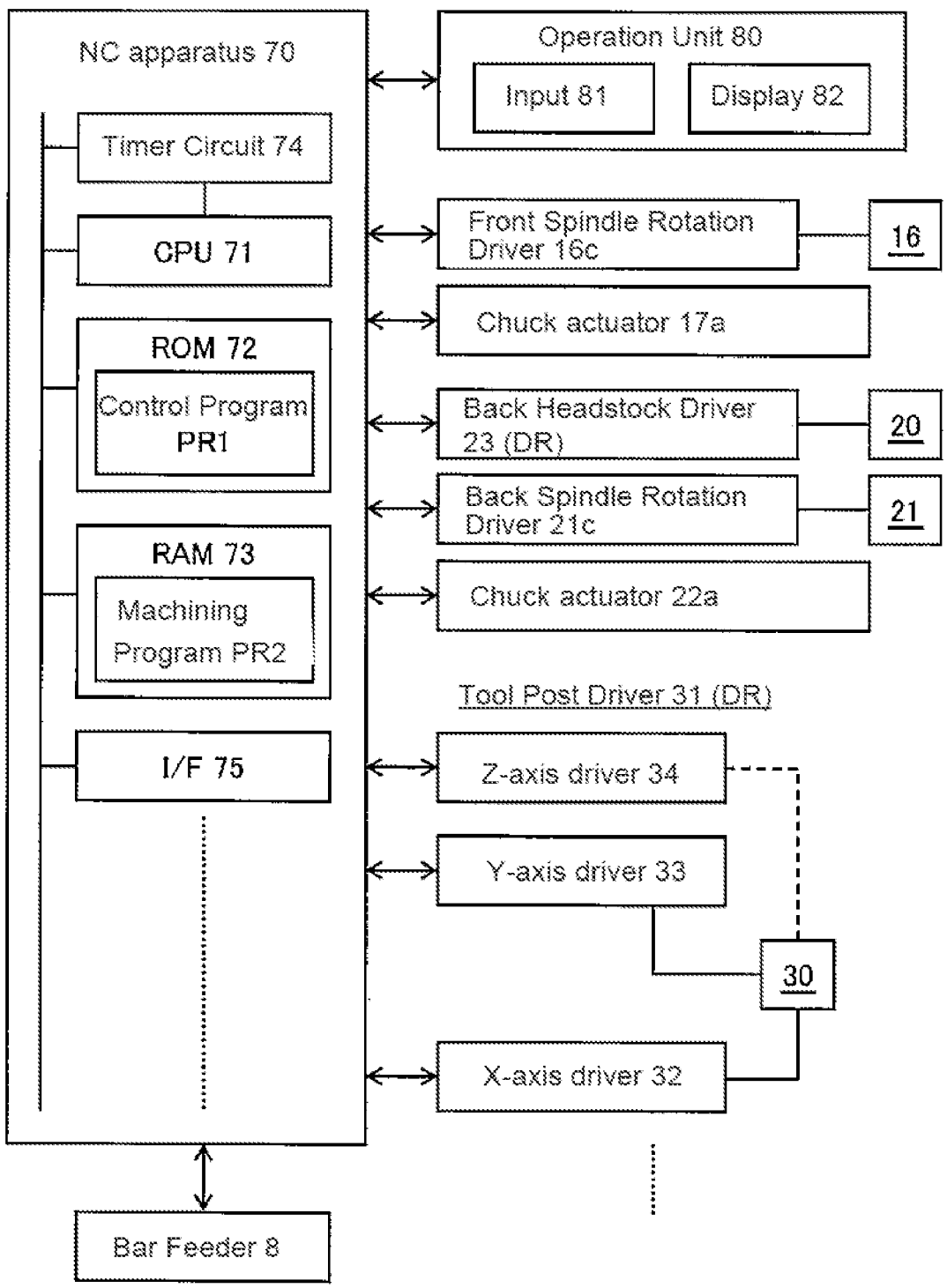
FIG. 9 is a block diagram of a modified embodiment schematically showing an exemplary configuration of an electrical circuit of the machine tool.

The driving unit DR may move the tool post 30 along the X-axis, the Y-axis, and Z-axis as shown in FIG. 9. The controller (70) may control movement of the tool TO1 in association with rotation of the workpiece W1 along the X-axis and the Y-axis and control vibration of the tool TO1 in association with rotation of the workpiece W1 along the Z-axis to thereby vibrate the positional relationship between the spindle 11 and the tool post 30 with respect to the Z-axis in association with rotation of the workpiece W1. In a lathe where the spindle 11 does not move along the Z-axis, the controller (70) may control vibration of the tool TO1 in association with rotation of the workpiece W1 along the Z-axis to form the eccentric shape (W1$p$) on the workpiece W1 regardless of a difference of the Z-coordinates between the first start point SpA and the first end point EpA and regardless of a difference of the Z-coordinates between the second start point SpB and the second end point EpB. The embodiment can provide a machine tool capable of improving freedom in eccentric shape forming.

Embodiment 7

In the machine tool (1) including the spindle 11 rotatable together with the workpiece W1 around the spindle axis AX0 and the tool post 30 holding the tool TO1 for use to machine the workpiece W1 and being capable of varying a positional relationship between the spindle 11 and the tool post 30 to form the eccentric shape (W1$p$) on the workpiece W1 around the eccentric axis AX3 deviating from the spindle axis AX0, a method of deciding the moving path of the tool TO1 includes:

(A1) a first proses ST1 (for example, Step S102 in FIG. 8) acquiring the coordinate of the first machining start point SpA of the eccentric shape (W1$p$) in the reference phase ($\theta$=0°) of the workpiece W1 around the spindle axis AX0, the coordinate of the second machining start point SpB of the eccentric shape (W1p) in the anti-phase (θ=180°) different from the reference phase by 180 degrees, the coordinate of the first machining end point EpA of the eccentric shape (W1p) in the reference phase (θ=0°), and the coordinate of the second machining end point EpB of the eccentric shape (W1p) in the anti-phase (θ=180°), and (A2) a second prosess ST2 (for example, Steps S104 to S112 in FIG. 8) deciding the moving path (C1) of the tool TO1 in association with rotation of the workpiece W1 at least according to the coordinates of the first machining start point SpA, the second machining start point SpB, the first machining end point EpA, and the second machining end point EpB to form the eccentric shape (W1p) around the eccentric axis AX3 passing the start point origin SpO between the first machining start point SpA and the second machining start point SpB and the end point origin EpO between the first machining end point EpA and the second machining end point EpB.

The eccentric shape (W1p) formed on the workpiece W1 in the embodiment may have variety in addition to the conventional eccentric shape of a constant radius around the axis parallel to the spindle axis AX0. The embodiment can provide a method of deciding the tool moving path capable of improving freedom in eccentric shape forming.

(2) Exemplary Configuration of the Lathe

Figure 3:
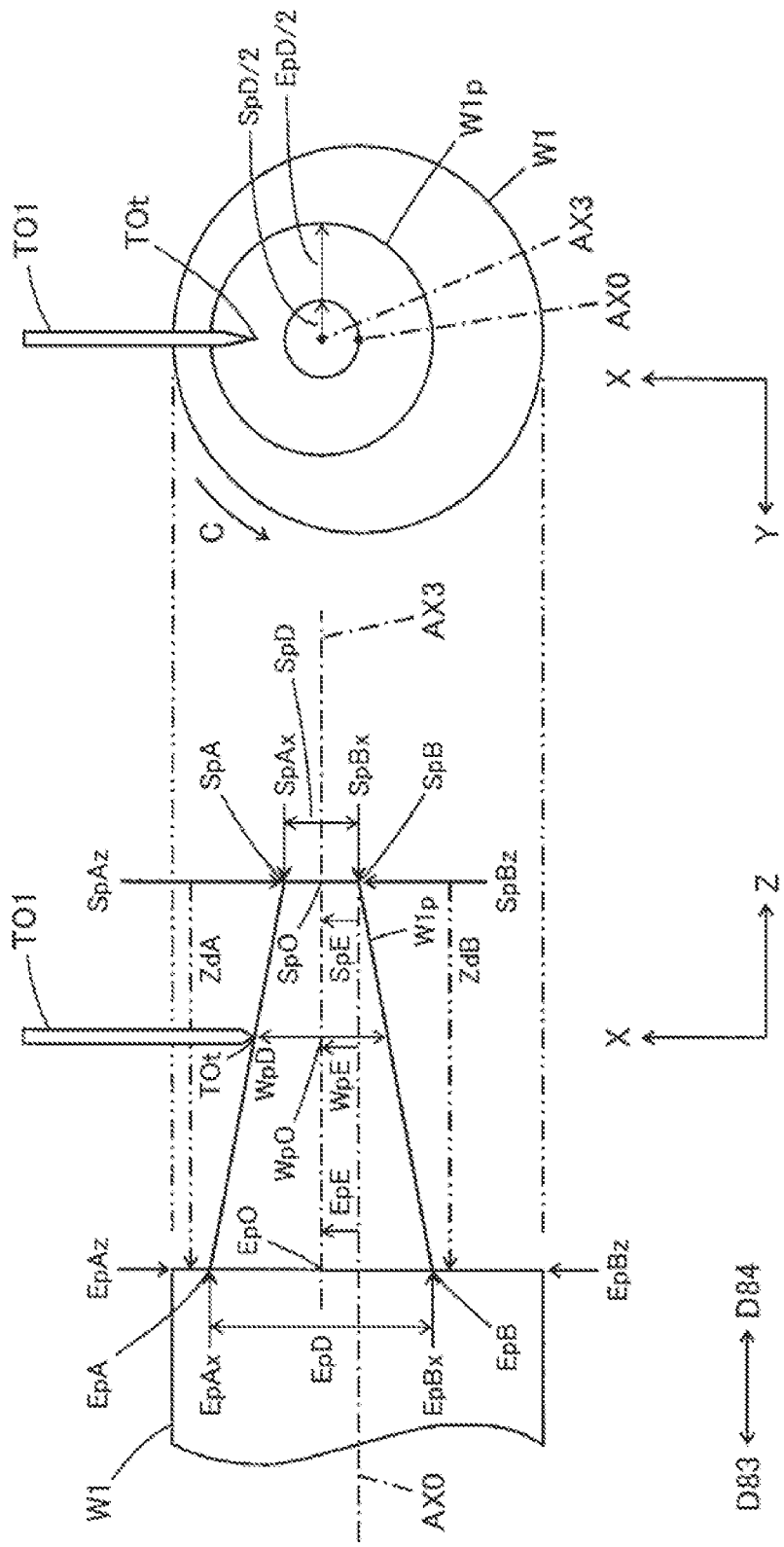
FIG. 3 schematically shows an exemplary forming of a tapered eccentric shape on a workpiece.

FIG. 1 is a front view schematically showing an exemplary configuration of the lathe 1, an example of the machine tool. FIG. 2 is a block diagram schematically showing an exemplary configuration of an electrical circuit of the lathe 1. FIG. 3 schematically shows an exemplary forming of the protrusion W1p on the workpiece W1, an example of the tapered eccentric shape. FIG. 3 further includes a view of the workpiece W1 as seen from the side having the protrusion W1p. In FIG. 1, a symbol D81 denotes an upper direction, a symbol D82 denotes a lower direction, a symbol D83 denotes a left direction, a symbol D84 denotes a right direction, all of which may be the directions viewing the lathe 1 in FIG. 1. As shown in FIG. 1 and FIG. 3, the lathe 1 may include a control axis such as the X-axis represented by "X", the Y-axis represented by "Y", the Z-axis represented by "Z", and a C-axis represented by "C". The Z-axis direction may be a horizontal direction along the spindle axis AX0 around which the workpiece W1 rotates. An X-axis direction perpendicular to the Z-axis may be either an up and down direction (the upper direction D81 and the lower direction D82) or an left and right direction (the left direction D83 and the right direction D84). A Y-axis direction may be a direction perpendicular to both the Z-axis and the X-axis. The C-axis may be a rotation axis around the spindle axis AX0. The drawings schematically show examples of the invention for purpose of explanation. Any description on position may include reverse relationship including right and left directions and rotation directions. Coincidence of direction and position may include a deviation from the exact coincidence.

The lathe 1 may include an NC lathe including a headstock 10 provided with the spindle 11 having a chuck 12, the headstock driver 13, a supporting bed 25 having a mounting hole 26 for a guide bush 14, the tool post 30, the tool post driver 31, and the NC apparatus 70. The headstock 10 may include a front headstock 15 and a back headstock 20, which is also called an opposite headstock. The front headstock 15 may incorporate a front spindle 16 having a chuck 17 such as a collet. The back headstock 20 may incorporate a back spindle 21 having a chuck 22 such as a collet. The front spindle 16 and the back spindle 21 also called an opposite spindle may be collectively referred to as the spindle 11. The chuck 17 and the chuck 22 may be collectively referred to as the chuck 12. The headstock driver 13 may include a front headstock driver 18 capable of driving the front headstock 15 along the Z-axis, and a back headstock driver 23 capable of driving the back headstock 20 along at least the Z-axis. The lathe 1 as shown in FIG. 1 and FIG. 2 may be a lathe of spindle sliding type that the front spindle 16 moves in the Z-axis direction. The headstock driver 13 and the tool post driver 31 may be an example of the driving unit DR capable of varying the positional relationship between the spindle 11 and the tool post 30. The NC apparatus 70 may be an example of the controller capable of controlling the positional relationship between the spindle 11 and the tool post 30

The front spindle 16 may releasably hold the bar workpiece W1 that a bar feeder 8 (FIG. 2) may insert from the back. The front spindle 16 holding the workpiece W1 may be rotatable around a spindle axis AX1. A front end 16a of the front spindle 16 may face the back spindle 21 while a back end 16b thereof may face the bar feeder 8. The front spindle 16 may have a through-hole 16h extended along the spindle axis AX1. The workpiece W1 may be inserted into the through-hole 16a from the back. A short bar material may be supplied to the chuck 17 from the front end 16a of the front spindle 16. The NC apparatus 70 may actuate a front spindle rotation driver 16c (FIG. 2) to rotate the front spindle 16 around the spindle axis AX1. The NC apparatus 70 may drive a chuck actuator 17a (FIG. 2) to control the operation of the chuck 17. The chuck 17 may include a collet. The front headstock driver 18 may drive the front headstock 15 in the Z-axis direction in accordance with a command from the NC apparatus 70, thereby moving the workpiece W1 held by the front spindle 16 in the Z-axis direction. The workpiece W1 may be a long solid columnar material or a long hollow cylindrical material.

A front end 21a of the back spindle 21 may face the front end 16a of the front spindle 16. The back spindle 21 may releasably hold the workpiece W1 with the chuck 22 where the workpiece W1 may be an unfinished workpiece protruded from the front end 16a of the front spindle 16. The back spindle 21 holding the workpiece W1 may be rotatable on a spindle axis AX2. The NC apparatus 70 may actuate a back spindle rotation driver 21c (FIG. 2) to rotate the back spindle 21 around the spindle axis AX2. The NC apparatus 70 may drive a chuck actuator 22a (FIG. 2) to control the operation of the chuck 22. The chuck 22 may include a collet. The back headstock driver 23 may move the back headstock 20 in the Z-axis direction and further in the X-axis direction or the Y-axis direction in accordance with a command from the NC apparatus 70. The workpiece W1 may be held by both the front spindle 16 and the back spindle 21. The spindle axis AX2 may coincide with the spindle axis AX1. The spindle axis AX1 and the spindle axis AX2 may be collectively referred to as the spindle axis AX0. A forward direction of the front spindle 16 may be a direction that the workpiece W1 is pushed out from the front spindle 16, which is the right direction D84 in FIG. 1. A backward direction of the front spindle 16 may be a direction toward the bar feeder 8, which is the left direction D83 in FIG. 1. A forward direction of the back spindle 21 may be a direction toward the front spindle 16, which is the left direction D83 in FIG. 1.

The supporting bed 25 may be located between the front headstock 15 and the back headstock 20 with respect to the Z-axis direction. The supporting bed 25 may have the mounting hole 26 penetrated in the Z-axis direction. The guide bush 14 may be inserted in the mounting hole 26 to be removably attached to the supporting bed 25 as shown in FIG. 1. The guide bush 14 may slidably support the workpiece W1 protruded forward from the through-hole 16h of the front spindle 16. The workpiece W1 supported by the guide bush 14 may slide in the Z-axis direction. A portion of the workpiece W1 protruded from the guide bush 14 toward the back spindle 21 (in the right direction D84) may be machined with the tool TO1.

The plural tools TO1 for use to machine the workpiece W1 held by at least one of the front spindle 16 and the back spindle 21 may be attached to the tool post 30. The plural tools TO1 may include a turning tool such as a cut-off tool and a rotary tool such as a drill and an endmill. The NC apparatus 70 may control forming an eccentric shape on the workpiece W1 with the turning tool as described later. The tool post 30 may include a gang tool post and a turret tool post. As shown in FIG. 2, the tool post driver 31 may include an X-axis driver 32 and a Y-axis driver 33. The X-axis driver 32 may move the tool post 30 along the X-axis in accordance with a command from the NC apparatus 70. The Y-axis driver 33 may move the tool post 30 along the Y-axis in accordance with a command from the NC apparatus 70. The tool TO1 may move on the X-Y plane along the X-axis and the Y-axis. The NC apparatus 70 may first control machining the front side of the workpiece W1 held by the front spindle 16 with the tool TO1. The NC apparatus 70 may then control cutting off the workpiece W1 held by both the front spindle 16 and the back spindle 21 with the cut-off tool. The NC apparatus 70 may then control machining the back side of the workpiece W1 held by the back spindle 21 with the tool TO1 to thereby form a product of the workpiece W1. The lathe 1 may be further provided with another tool post (not shown) such as a tool post specially for back side machining use.

As shown in FIG. 2, the NC apparatus 70 may connect to the bar feeder 8, an operation unit 80, the front headstock driver 18, the front spindle rotation driver 16c, the chuck actuator 17a, the back headstock driver 23, the back spindle rotation driver 21c, the chuck actuator 22a, the X-axis driver 32, and the Y-axis driver 33. The front headstock driver 18, the back headstock driver 23, the X-axis driver 32, and the Y-axis driver 33 may respectively include not-shown servo motors (built-in motors, for example) and servo amplifiers to vary the positional relationship between the spindle 11 and the tool post 30 in accordance with a command from the NC apparatus 70. The front spindle rotation driver 16c and the back spindle rotation driver 21c may respectively include not-shown servo motors (built-in motors, for example) and servo amplifiers to rotate the spindle 11 around the spindle axis AX0 in accordance with a command from the NC apparatus 70. The NC apparatus 70 may control the rotation angle of the workpiece W1 (a C-axis angle θ) by controlling the front spindle rotation driver 16c and the back spindle rotation driver 21c. The chuck actuator 17a may drive the chuck 17 of the front spindle 16. The chuck actuator 22a may drive the chuck 22 of the back spindle 21. The NC apparatus 70 may include a CPU (Central Processing Unit) 71, a ROM (Read Only Memory) 72 or a semiconductor memory, a RAM (Random Access Memory) 73 or a semiconductor memory, a timer circuit 74, and an I/F (Interface) 75. In FIG. 2, the IF 75 may collectively represent plural interfaces of the bar feeder 8, the operation unit 80, the front headstock driver 18, the front spindle rotation driver 16c, the chuck actuator 17a, the back headstock driver 23, the back spindle rotation driver 21c, the chuck actuator 22a, the X-axis driver 32, and the Y-axis driver 33. The ROM 72 may store a control program PR1 for interpreting and executing a machining program PR2. The ROM 72 may be a rewritable semiconductor memory. The RAM 73 may rewritably store the machining program PR2 written by an operator. The machining program may be also called an NC program. The CPU 71 may use the RAM 73 as a work area to execute the control program PR1 stored in the ROM 72 to enable the NC apparatus 70 to operate accordingly.

The operation unit 80 may include an input 81 and a display 82 to serve as a user interface for the NC apparatus 70. The input 81 may include a button and a touch panel accessible by the operator. The display 82 may include a monitor that displays various information relating to the lathe 1 including the settings given by the operator. The operator can store the machining program PR2 in the RAM 73 by using the operation unit 80 and an external computer (not shown).

The NC apparatus 70 may drive the driving unit DR to control the positional relationship between the spindle 11 and the tool post 30 to form the protrusion W1p or the eccentric shape (FIG. 3) on the workpiece W1 with the tool TO1 or the turning tool. The protrusion W1p may be the eccentric shape formed around the eccentric axis AX3 deviating from the spindle axis AX0. In FIG. 3, the spindle 11 holding the workpiece W1 may be the front spindle 16 or the back spindle 21. The spindle axis AX0 may be the spindle axis AX1 around which the front spindle 16 rotates or the spindle axis AX2 around which the back spindle 21 rotates. The NC apparatus 70 may receive an input of an eccentric distance and a radius of a desired protrusion to form an eccentric protrusion whose shape is limited to a columnar shape around an eccentric axis parallel to the spindle axis. The invention provides a variety of eccentric shapes including a tapered eccentric protrusion, a protrusion around an eccentric axis unparallel to the spindle axis, and a protrusion whose machining start section and machining end section are angled with respect to the X-Y plane.

The NC apparatus 70 may control forming the protrusion W1p on the workpiece W1 according to the coordinates of the four points of the protrusion W1p as shown in FIG. 3, especially the coordinates of the first start point SpA, the second start point SpB, the first end point EpA, and the second end point EpB. The first start point SpA may be a machining start point of the protrusion W1p in the reference phase (for example, θ=0°) of the workpiece W1 around the spindle axis AX0. The second start point SpB may be a machining start point of the protrusion W1p in the anti-phase (for example, θ=180°) different from the reference phase by 180 degrees. The first end point EpA may be a machining end point of the protrusion W1p in the reference phase (for example, θ=0°). The second end point EpB may be a machining end point of the protrusion W1p in the anti-phase (for example, θ=180°).

The NC apparatus 70 may set the start point origin SpO between the first start point SpA and the second start point SpB. The NC apparatus 70 may set the end point origin EpO between the first end point EpA and the second end point EpB. The start point origin SpO may be favorably a middle point of the line segment SpA-SpB connecting the first start point SpA and the second start point SpB. The end point origin EpO may be favorably a middle point of the line segment EpA-EpB connecting the first end point EpA and the second end point EpB. The NC apparatus 70 may decide a moving path of a tool edge TOt of the tool TO1 in association with rotation of the workpiece W1 at least according to the coordinates of the first start point SpA, the second start point SpB, the first end point EpA, and the second end point EpB to form the protrusion W1p around the eccentric axis AX3 passing the start point origin SpO and the end point origin EpO. The NC apparatus 70 may control movement of the tool edge TOt along the moving path in association with rotation of the workpiece W1 while moving the workpiece W1 in the Z-axis direction. The NC apparatus 70 may control movement of the tool edge TOt along the moving path in association with rotation of the workpiece W1 while varying a relative position of the tool edge TOt with respect to the workpiece W1 on the Z-axis. The Z-coordinate (a coordinate on the Z-axis) may increase as the workpiece W1 moves rightward (toward D84 in FIG. 3) in the Z-axis direction. The Z-coordinate of the relative position of the tool edge TOt not moving in the Z-axis direction may increase leftward (toward D83). For convenience of explanation, the Z-coordinate of the workpiece W1 corresponding to the tool edge TOt may be explained as the Z-coordinate of the position of the tool edge TOt on the protrusion W1p. As described above, the NC apparatus 70 may control vibration of the workpiece W1 in association with rotation of the workpiece W1 along the Z-axis as required.

The NC apparatus 70 may set the halfway point origin WpO between the start point origin SpO and the end point origin EpO on the eccentric axis AX3 according to the Z-coordinate of the position of the tool edge TOt on the protrusion W1p. The NC apparatus 70 may calculate the eccentric amount (WpE) of the halfway point origin WpO deviating from the spindle axis AX0 and the diameter (WpD) of the protrusion W1p at the halfway point origin WpO (WpD>0) according to the coordinates of the four points (SpA, SpB, EpA, EpB). If the eccentric axis AX3 is parallel to the spindle axis AX0 as shown in FIG. 3, the eccentric amount (WpE) of the halfway point origin WpO may be equal to the eccentric amount (SpE) of the start point origin SpO deviating from the spindle axis AX0 and to the eccentric amount (EpE) of the end point origin EpO deviating from the spindle axis AX0.

(3) Exemplary Tool Moving Path Around the Halfway Point Origin WpO

Figure 4:
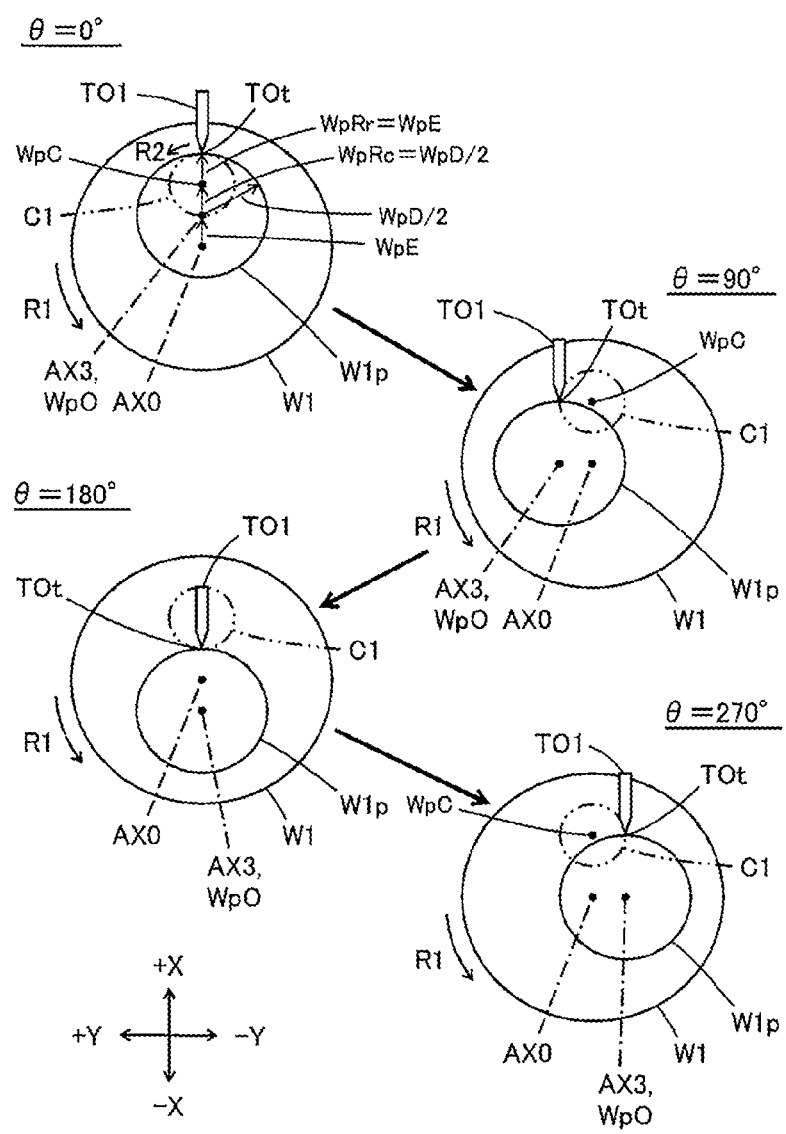
FIG. 4 schematically shows an exemplary movement of a tool in association with rotation of the workpiece on an X-Y plane.

FIG. 4 schematically shows an exemplary movement of the tool TO1 in association with rotation of the workpiece on the X-Y plane containing the halfway point origin WpO according to the eccentric amount WpE of the halfway point origin WpO and the diameter WpD of the protrusion W1p at the halfway point origin WpO. The tool edge TOt may stay at the largest X-coordinate when the C-axis angle θ is 0 degree (θ=0°). The X-coordinate (a coordinate on the X-axis) may be larger in a +X direction and smaller in a −X direction. The Y-coordinate (a coordinate on the Y-axis) may be larger in a +Y direction and smaller in a −Y direction.

When the C-axis angle θ is 0 degree (θ=0°), the tool edge TOt of the tool TO1 on the X-Y plane may be in a position whose X-coordinate may be obtained by adding the eccentric amount WpE to the radius (WpD/2) of the protrusion W1p. When the C-axis angle θ is 180 degrees (θ=180°), the tool edge TOt on the X-Y plane may be in a position whose X-coordinate may be obtained by subtracting the eccentric amount WpE from the radius (WpD/2) of the protrusion W1p. In FIG. 4, the radius of the protrusion W1p is larger than the eccentric amount WpE (WpD/2>WpE). The tool edge TOt is therefore in a position in the +X direction with respect to the spindle axis AX0. If the radius of the protrusion W1p is smaller than the eccentric amount WpE (WpD/2<WpE), the tool edge TOt may be in a position in the −X direction with respect to the spindle axis AX0.

The tool edge TOt may make a single rotation in a rotation direction R2 along the circumference of the imaginary circle C1 whose diameter is equal to a line segment connecting the 0° position at θ=0° and the 180° position at θ=180° while the workpiece W1 makes a single rotation around the spindle axis AX0 in a rotation direction R1. The imaginary circle C1 may be conceptually included in the imaginary circular arc. The circumference of the imaginary circle C1 may be conceptually included in the circumference of the imaginary circular arc. An X-coordinate WpRc of the center (the circular arc center WpC) of the imaginary circle C1 may be a middle point of the line segment connecting the 0° position and the 180° position, which corresponds to the radius (WpD/2) of the protrusion W1p. The radius (a circular arc radius WpRr) of the imaginary circle C1 may be equal to the eccentric amount WpE of the halfway point origin WpO deviating from the spindle axis AX0. As shown in FIG. 4, the tool edge TOt may move along the circumference of the imaginary circle C1 while the C-axis angle θ changes from 0° to 90°, from 90° to 180°, from 180° to 270°, and from 270° to 0°. The tool TO1 may thereby form the outline of the protrusion W1p on the X-Y plane containing the halfway point origin WpO.

Figure 5:
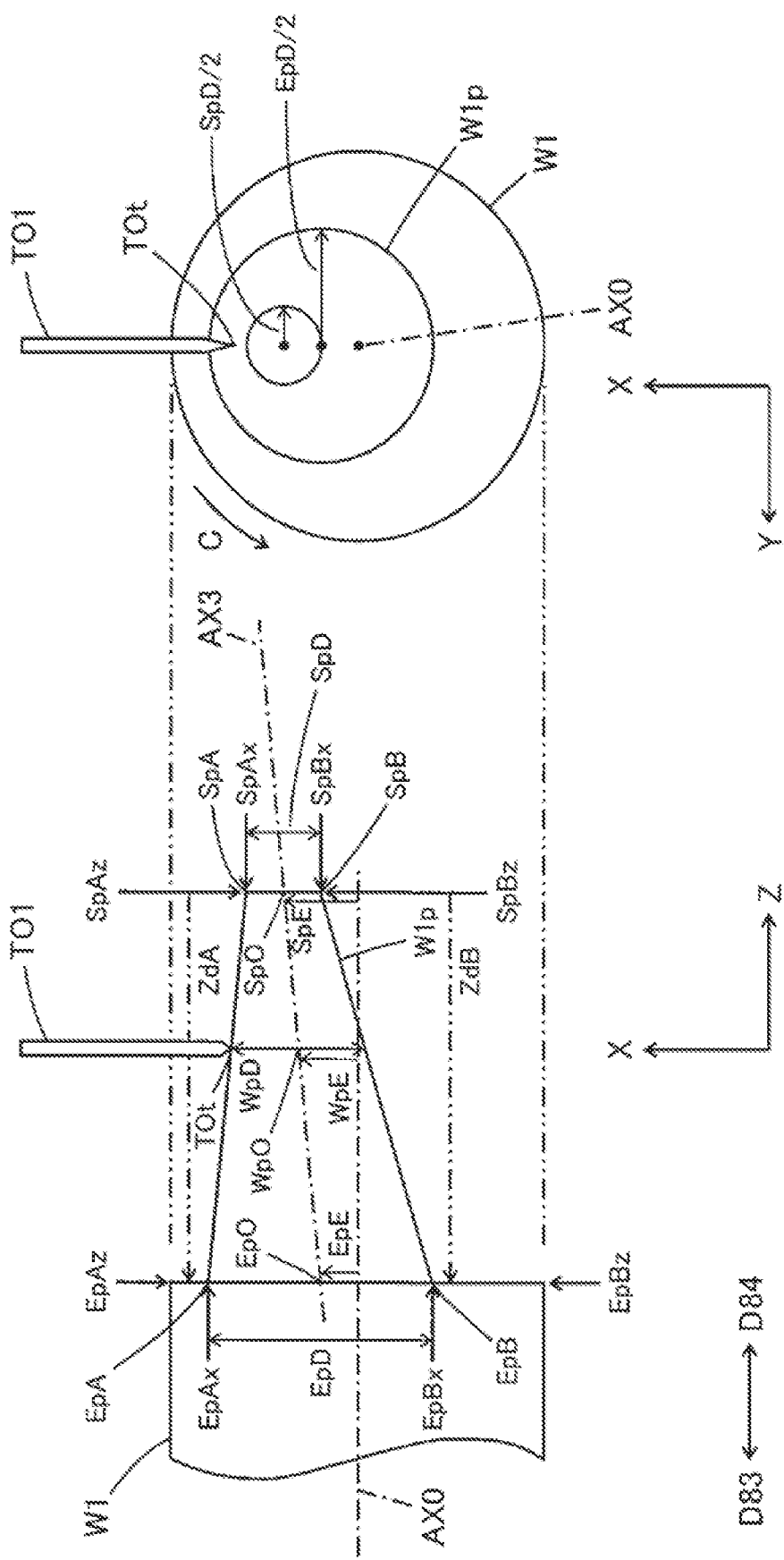
FIG. 5 schematically shows an exemplary forming of a tapered eccentric shape on the workpiece around an eccentric axis unparallel to a spindle axis.
Figure 6:
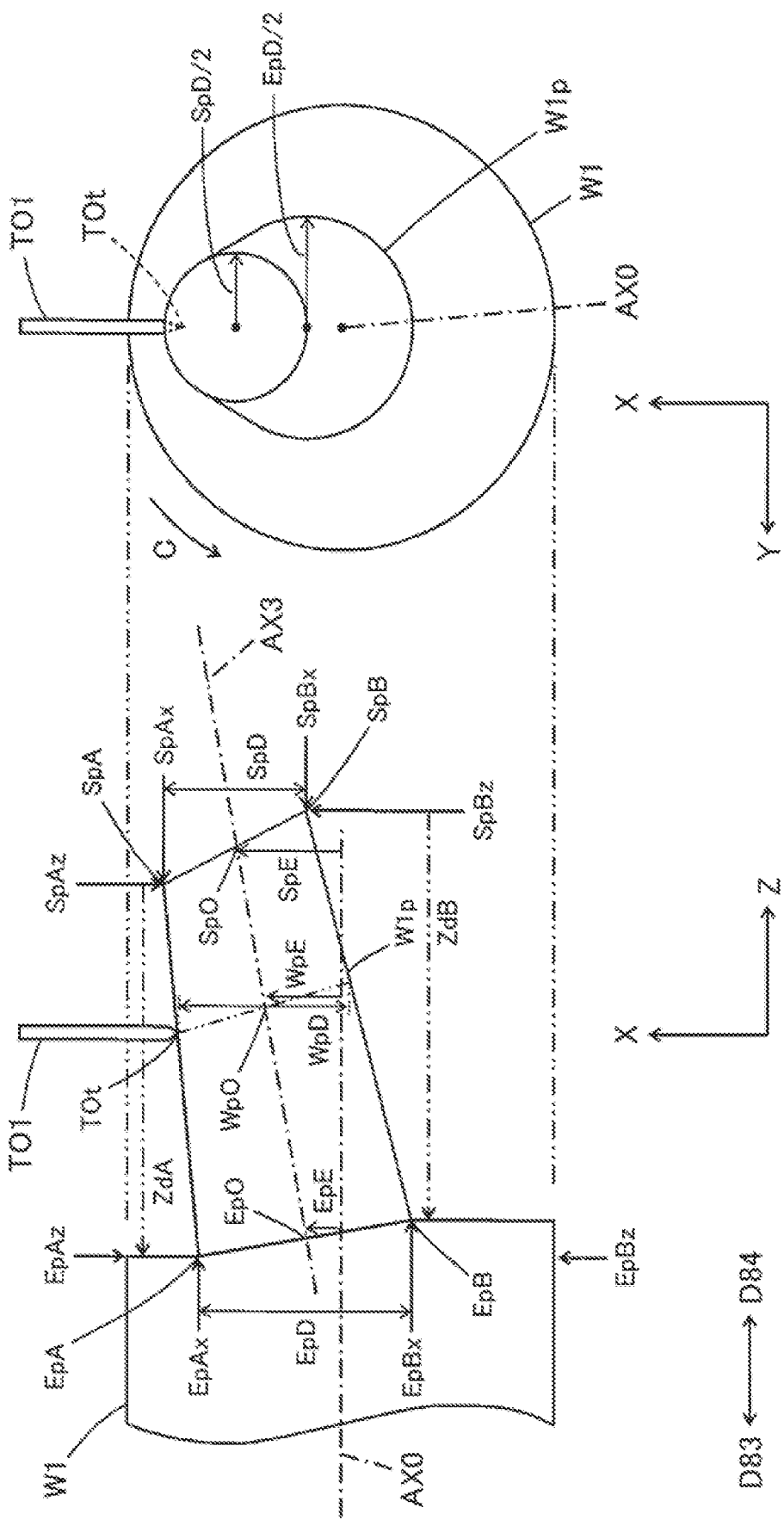
FIG. 6 schematically shows an exemplary forming of a tapered eccentric shape whose machining start section and machining end section are angled with respect to the X-Y plane.

(4) Varying the Positional Relationship Between the Spindle and the Tool Post The NC apparatus 70 can control forming various eccentric shapes as shown in FIGS. 3, 5, and 6 by acquiring the coordinates of the four points (SpA, SpB, EpA, EpB). The coordinates may include x, y, and z coordinates respectively representing the X-coordinate, the Y-coordinate, and the Z-coordinate of the points. The first start point SpA may have x, y, and z coordinates (SpAx, SpAy, SpAz). The second start point SpB may have x, y, and z coordinates (SpBx, SpBy, SpBz). The first end point EpA may have x, y, and z coordinates (EpAx, EpAy, EpAz). The second end point EpB may have x, y, and z coordinates (EpBx, EpBy, EpBz). The value of the Z-coordinate may become larger as the workpiece W1 moves rightward in the D84 direction. The Z-coordinate of the first end point may be larger than that of the first start point (EpAz>SpAz). The Z-coordinate of the second end point may be larger than that of the second start point (EpBz>SpBz). If the eccentric axis AX3 deviates from the spindle axis AX0 in the X-axis direction, the Y-coordinates of the first start point, the second start point, the first end point, and the second end point may be equal to zero (SpAy=SpBy=EpAy=EpBy=0). Then, the NC apparatus 70 may acquire the coordinates of the four points (SpA, SpB, EpA, EpB). Instead, the Y-coordinate (SpAy, SpBy, EpAy, EpBy) may be equal to any value but zero. Then, the NC apparatus can control forming the protrusion W1p on the workpiece W1 with the eccentric axis AX3 offset in the Y-axis direction.

In FIG. 3, the Z-coordinate of the first start point may be equal to that of the second start point (SpAz=SpBz). The Z-coordinate of the first end point may be equal to that of the second end point (EpAz=EpBz). The Z-coordinates of the start point may be smaller than those of the end point (SpAz=SpBz)<(EpAz=EpBz). The X-coordinate of the start point origin SpO may be obtained by: SpOx=(SpAx+SpBx)/2. The Y-coordinate of the start point origin SpO may be equal to zero (SpOy=0). The Z-coordinate of the start point origin SpO may be equal to that of the first start point and that of the second start point (SpOz=SpAz=SpBz). Accordingly, the eccentric amount SpE of the start point origin SpO may be equal to: SpOx=(SpAx+SpBx)/2. The diameter SpD of the protrusion W1p may be equal to: |SpAx−SpBx|. The protrusion W1p may have the machining start section passing the first start point SpA and the second start point SpB around the eccentric axis AX3. The X-coordinate of the end point origin EpO may be obtained by: EpOx=(EpAx+EpBx)/2. The Y-coordinate of the end point origin EpO may be equal to zero (EpOy=0). The Z-coordinate of the end point origin EpO may be equal to that of the first end point and that of the second end point (EpOz=EpAz=EpBz). Accordingly, the eccentric amount EpE of the end point origin EpO may be equal to: EpOx=(EpAx+EpBx)/2. The diameter EpD of the protrusion W1p may be equal to: |EpAx−EpBx|. In FIG. 3, the X-coordinate of the start point origin SpO may be equal to that of the end point origin EpO (SpOx=EpOx). The protrusion W1p may have the machining end section passing the first end point EpA and the second end point EpB around the eccentric axis AX3. The moving amount ZdA from the first start point SpA to the first end point EpA in the Z-axis direction may be obtained by: EpAz−SpAz. The moving amount ZdB from the second start point SpB to the second end point EpB in the Z-axis direction may be obtained by: EpBz−SpBz. In FIG. 3, the moving amount ZdA may be equal to the moving amount ZdB. A Z-axis feed pitch (Zpt) for a single rotation of the workpiece W1 may be obtained by: ZdA/RevC=ZdB/RevC where RevC (RevC>1) represents the number of revolutions of the workpiece W1 from the machining start section to the machining end section. The unit of the Z-axis feed pitch Zpt may be mm/rev.

The halfway point origin WpO may have x, y, and z ordinates (WpOx, WpOy, WpOz). The workpiece W1 may make a first rotation (n=0) at the start point origin SpO and a second rotation (n=1) at the halfway point origin WpO (0≤n<RevC). The halfway point origin WpO may gradually approach the end point origin EpO as the workpiece W1 rotates. The X-coordinate WpOx of the halfway point origin WpO may be equal to the eccentric amount WpE of the halfway point origin WpO, the eccentric amount SpE of the start point origin SpO, and the eccentric amount EpE of the end point origin EpO. The Y-coordinate WpOy of the halfway point origin WpO may be equal to zero. When the C-axis angle θ is 0 degree (θ=0°), the Z-coordinate WpOz of the halfway point origin WpO may be obtained by:

$$WpOz = SpAz + \{(n/RevC) \times ZdA\} \quad (1)$$

When the C-axis angle θ is 0 degree (θ=0°), the diameter WpD of the protrusion W1p at the halfway point origin WpO may be obtained by:

$$WpD = SpD + \{(n/RevC) \times (EpD-SpD)\} \quad (2)$$

The NC apparatus 70 may control interpolating the diameter WpD of the protrusion W1p at the halfway point origin WpO according to the diameter SpD at the start point origin SpO and the diameter EpD at the end point origin EpO.

As described referring to FIG. 4, the moving path of the tool edge TOt may extend along the circumference of the imaginary circle C1 according to the Z-coordinate of the position of the tool edge TOt on the protrusion W1p. The X-coordinate WpRc of the center (the circular arc center WpC) of the imaginary circle C1 may be equal to the radius (WpD/2) of the protrusion W1p according to the Z-coordinate WpOz of the halfway point origin WpO. An X-coordinate (SpRc) of the circular arc center WpC at the Z-coordinate (SpOz=SpAz=SpBz) of the start point origin SpO may be equal to the radius (SpD/2) of the machining start section. An X-coordinate (EpRc) of the circular arc center WpC at the Z-coordinate (EpOz=EpAz=EpBz) of the end point origin EpO may be equal to the radius (EpD/2) of the machining end section.

The radius (the circular arc radius WpRr) of the imaginary circle C1 may be equal to the eccentric amount WpE of the halfway point origin WpO deviating from the spindle axis AX0. A circular arc radius (SpRr) at the Z-coordinate SpOz of the start point origin SpO may be equal to the eccentric amount SpE of the start point origin SpO deviating from the spindle axis AX0. A circular arc radius (EpRr) at the Z-coordinate EpOz of the end point origin EpO may be equal to the eccentric amount EpE of the end point origin EpO deviating from the spindle axis AX0. The NC apparatus 70 may control movement of the tool edge TOt in association with rotation of the workpiece W1 along the circumference of the imaginary circle C1 on the X-Y plane containing the halfway point origin WpO. The imaginary circle C1 may have the circular arc radius WpRr around the circular arc center WpC whose X-coordinate WpRc depends on the Z-coordinate WpOz of the halfway point origin WpO. The NC apparatus 70 may thereby decide the moving path of the tool TO1 along the circumference of the imaginary circle C1 around the circular arc center WpC offset from the spindle axis AX0 according to the diameter WpD at the halfway point origin WpO. The NC apparatus 70 may control movement of the tool edge TOt in association with rotation of the workpiece W1 along the circumference of the imaginary circle C1 having the circular arc radius WpRr around the circular arc center WpC according to movement of the workpiece W1 in the Z-axis direction. The NC apparatus 70 may thereby control forming the tapered protrusion W1p on the workpiece W1 around the eccentric axis AX3.

The X and Y coordinates of the tool edge TOt may be calculated in rotation angle unit (resolution Reso) less than a single rotation of the workpiece W1. The resolution Reso may be the C-axis angle larger than 0° and smaller than 360°. The Z-coordinate of the circular arc center WpC may be equal to the Z-coordinate WpOz of the halfway point origin WpO, which may vary by (ZdA/RevC) per every rotation of the workpiece W1. The Z-coordinate of the circular arc center WpC may vary by (θ/360)×(ZdA/RevC) when the workpiece W1 rotates at the C-axis angle θ. The Z-coordinate WpOz of the halfway point origin WpO, which is the Z-coordinate of the circular arc center WpC, may be obtained by:

$$WpOz = SpAz + \{(n/RevC) \times ZdA\} + \{(\theta/360) \times (ZdA/RevC)\} \quad (3)$$
$$= SpAz + \{n' \times (ZdA/RevC)\}$$

where the number of times of rotation (n') may be the value obtained by adding (θ/360) to the number of times of rotation (n). The diameter WpD of the protrusion W1p at the halfway point origin WpO may be obtained by:

$$WpD = SpD + \{(n'/RevC) \times (EpD-SpD)\} \quad (4)$$

As described above, the X-coordinate WpRc of the circular arc center WpC may be equal to the radius (WpD/2) of the protrusion W1p. The circular arc radius WpRr may be equal to the eccentric amount WpE.

The NC apparatus 70 may calculate the X-coordinate WpRc of the circular arc center WpC and the circular arc radius WpRr in rotation angle unit (resolution Reso). The NC apparatus 70 may control movement of the tool edge TOt in association with rotation of the workpiece W1 along the circumference of the imaginary circular arc (the imaginary circle C1) having the circular arc radius WpRr around the circular arc center WpC whose X-coordinate WpRc depends on the Z-coordinate WpOz of the halfway point origin WpO. The NC apparatus 70 may thereby control forming the protrusion W1p on the workpiece W1 around the eccentric axis AX3.

FIG. 5 schematically shows an exemplary forming of the tapered eccentric protrusion W1p on the workpiece W1 around the eccentric axis AX3 unparallel to the spindle axis AX0. FIG. 5 further includes a view of the workpiece W1 as seen from the side having the protrusion W1p. The Z-coordinate of the first start point may be equal to that of the second start point (SpAz=SpBz). The Z-coordinate of the first end point may be equal to that of the second end point (EpAz=EpBz). The Z-coordinates of the start points may be smaller than those of the end points (SpAz=SpBz)< (EpAz=EpBz). The X-coordinate of the start point origin SpO may be obtained by: SpOx=(SpAx+SpBx)/2. The Y-coordinate of the start point origin SpO may be equal to zero (SpOy=0). The Z-coordinate of the start point origin SpO may be equal to that of the first start point and that of the second start point (SpOz=SpAz=SpBz). Accordingly, the eccentric amount SpE of the start point origin SpO may be equal to: SpOx=(SpAx+SpBx)/2. The diameter SpD of the protrusion W1p at the machining start section may be equal to: |SpAx−SpBx|. The X-coordinate of the end point origin EpO may be obtained by: EpOx=(EpAx+EpBx)/2. The Y-coordinate of the end point origin EpO may be equal to zero (EpOy=0). The Z-coordinate of the end point origin EpO may be equal to that of the first end point and that of the second end point (EpOz=EpAz=EpBz). Accordingly, the eccentric amount EpE of the end point origin EpO may be equal to: EpOx=(EpAx+EpBx)/2. The diameter EpD of the protrusion W1p at the machining end section may be equal to: |EpAx−EpBx|. In FIG. 5, the X-coordinate of the start point origin SpO may be larger than that of the end point origin EpO (SpOx>EpOx).

The Z-coordinate WpOz of the halfway point origin WpO may be obtained by the formula (1) or (3) as above described. When the C-axis angle θ is 0 degree (θ=0°), the eccentric amount WpE of the halfway point origin WpO may be obtained by:

$$WpE=SpE+\{(n/\text{RevC})\times(EpE-SpE)\} \quad (5)$$

When the C-axis angle θ is not 0 degree (θ=0°), the eccentric amount WpE of the halfway point origin WpO may be obtained by:

$$WpE=SpE+\{(n'/\text{RevC})\times(EpE-SpE)\} \quad (6)$$

where (n') may be a value obtained by adding (θ/360) to the number of times of rotation (n). The NC apparatus 70 may control interpolating the eccentric amount WpE of the halfway point origin WpO deviating from the spindle axis AX0 according to the eccentric amount SpE of the start point origin SpO and the eccentric amount EpE of the end point origin EpO.

The diameter WpD of the protrusion W1p at the halfway point origin WpO may be obtained by the formula (2) or (4) as described above.

As described referring to FIG. 4, the moving path of the tool edge TOt may extend along the circumference of the imaginary circle C1 according to the Z-coordinate of the position of the tool edge TOt on the protrusion W1p. The X-coordinate WpRc of the circular arc center WpC may be equal to the radius (WpD/2) of the protrusion W1p according to the Z-coordinate WpOz of the halfway point origin WpO. The circular arc radius WpRr may be equal to the eccentric amount WpE of the halfway point origin WpO deviating from the spindle axis AX0. The NC apparatus 70 may control movement of the tool edge TOt in association with rotation of the workpiece W1 along the circumference of the imaginary circular arc (the imaginary circle C1) on the X-Y plane containing the halfway point origin WpO. The imaginary circular arc may have the circular arc radius WpRr around the circular arc center WpC whose X-coordinate WpRc depends on the Z-coordinate WpOz of the halfway point origin WpO. The NC apparatus 70 may thereby decide the moving path of the tool TO1 along the circumference of the imaginary circular arc (the imaginary circle C1) of the size according to the eccentric amount WpE. The NC apparatus 70 may control movement of the tool edge TOt in association with rotation of the workpiece W1 along the circumference of the imaginary circular arc having the circular arc radius WpRr around the circular arc center WpC according to movement of the workpiece W1 in the Z-axis direction. The NC apparatus 70 may thereby control forming the protrusion W1p on the workpiece W1 around the eccentric axis AX3 unparallel to the spindle axis AX0.

FIG. 6 schematically shows an exemplary forming of the tapered eccentric protrusion W1p whose machining start section and machining end section are angled with respect to the X-Y plane. FIG. 6 further includes a view of the workpiece W1 as seen from the side having the protrusion W1p. The Z-coordinate SpAz of the first start point SpA may be different from the Z-coordinate SpBz of the second start point SpB. The Z-coordinate EpAz of the first end point EpA may be different from the Z-coordinate EpBz of the second end point EpB. The moving amount ZdA in the Z-axis direction from the first start point SpA to the first end point EpA may be different from the moving amount ZdB in the Z-axis direction from the second start point SpB to the second end point EpB. In FIG. 6, the Z-coordinate of the first start point may be larger than that of the second start point (SpAz >SpBz). The Z-coordinate of the first end point may be larger than that of the second end point (EpAz >EpBz). The moving amount ZdB may be larger than the moving amount ZdA (ZdB>ZdA). The X-coordinate of the start point origin SpO may be obtained by: SpOx=(SpAx+SpBx)/2. The Y-coordinate of the start point origin SpO may be equal to zero (SpOy=0). The Z-coordinate of the start point origin SpO may be obtained by: SpOz=(SpAz+SpBz)/2. Accordingly, the eccentric amount SpE of the start point origin SpO may be equal to: SpOx=(SpAx+SpBx)/2. The diameter SpD of the protrusion W1p at the machining start section may be equal to: |SpAx−SpBx|. The X-coordinate of the end point origin EpO may be obtained by: EpOx= (EpAx+EpBx)/2. The Y-coordinate of the end point origin EpO may be equal to zero (EpOy=0). The Z-coordinate of the end point origin EpO may be obtained by: EpOz= (EpAz+EpBz)/2. Accordingly, the eccentric amount EpE of the end point origin EpO may be equal to: EpOx=(EpAx+ EpBx)/2. The diameter EpD of the protrusion W1p at the machining end section may be equal to: |EpAx−EpBx|. The eccentric amount WpE of the halfway point origin WpO may be obtained by the formula (5) or (6) as described above. The diameter WpD of the protrusion W1P at the halfway point origin WpO may be obtained by the formula (2) or (4) as described above.

The NC apparatus 70 may necessarily control vibration of the workpiece W1 along the Z-axis in association with rotation of the workpiece W1 around the spindle axis AX0 to form the protrusion W1p on the workpiece W1 as shown in FIG. 6.

FIG. 7 schematically shows how the relative position of the tool TO1 is decided to form the tapered protrusion W1p whose machining start section and machining end section are angled with respect to the X-Y plane As shown in FIG. 7, the Z-coordinate of the first line segment SpA-EpA connecting the first start point SpA and the first end point EpA may not match the Z-coordinate of the second line segment SpB-EpB connecting the second start point SpB and the second end point EpB. The first line segment SpA-EpA may consist of plural sections divided by adjacent points. The second line segment SpB-EpB may consist of plural sections divided by adjacent points. The position of the tool edge TOt in a section on the first line segment SpA-EpA may match the position of the tool edge TOt in a section on the second line segment SpB-EpB.

The first line segment SpA-EpA and the second line segment SpB-EpB may be respectively equally divided by the number of divisions N where the number of divisions N may be the number of revolutions RevC of the workpiece W1 rotating from the machining start section to the machining end section of the protrusion W1p. The last section (immediately before the first end point EpA/the second end point EpB) of the first line segment SpA-EpA/the second line segment SpB-EpB may be shorter than the other sections if the number of revolutions RevC is not an integer. In FIG. 7, the first line segment SpA-EpA may have a point "An" where "n" (integer) represents the number of times of rotation. The second line segment SpB-EpB may have a point "Bn" where "n" (integer) represents the number of times of rotation. The first line segment SpA-EpA may further have a point "An+1" (Zan+1) where n+1 represents the number of times of rotation. The second line segment SpB-EpB may further have a point "Bn+1" (Zbn+1) where n+1 represents the number of times of rotation. The first start point SpA may be referred to as the point A0 where n=0. The second start point SpB may be referred to as the point B0 where n=0.

The point An may have x, y, and z coordinates (Xan, Yan, Zan). The point Bn may have x, y, and z coordinates (Xbn, Ybn, Zbn). The Y-coordinate of the point An and the Y-coordinate of the point Bn may be equal to zero (Yan=Ybn=0). The point An may have a projection coordinate (Xan, 0) on the X-Y plane. The point Bn may have a projection coordinate (Xbn, 0) on the X-Y plane. The NC apparatus 70 may control positioning the tool edge TOt at the n times rotation to form the protrusion W1p of a circle of a diameter corresponding to the line segment connecting the points (Xan, 0) and (Xbn, 0) on the X-Y plane. The center of the circle on the X-Y plane may be equal to the halfway point origin WpO. The diameter WpD of the circle on the X-Y plane may be obtained by: Xan−Xbn. The NC apparatus 70 may control movement of the tool edge TOt on the X-Y plane along the circumference of the imaginary circle C1 as defined by the eccentric amount WpE (of the halfway point origin WpO) and the diameter WpD.

The Z-coordinate of the position of the tool edge TOt may have different variation between the first line segment SpA-EpA and the second line segment SpB-EpB. The number of divisions N may depend on whichever line segment having a larger variation in the Z-coordinate among the first line segment SpA-EpA and the second line segment SpB-EpB. The number of divisions N corresponding to the number of revolutions RevC may be obtained by: MAX (ZdA:ZdB)/Zpt where the "MAX (ZdA:ZdB)" may be the moving amount ZdA in the Z-axis direction from the first start point SpA to the first end point EpA or the moving amount ZdB in the Z-axis direction from the second start point SpB to the second end point EpB, whichever is larger, and the "Zpt" may be the Z-axis feed pitch of the workpiece W1 per every rotation.

The Z-coordinate of the position of the tool edge TOt on the protrusion W1p may be a Z-coordinate Zan of the point An at the C-axis angle θ=0° and a Z-coordinate Zbn of the point Bn at the C-axis angle θ=180°. Variation in the Z-coordinate Zac of the position of the tool edge TOt on the first line segment SpA-EpA per every rotation of the workpiece W1 may be obtained by: Zac=ZdA/RevC. Variation in the Z-coordinate Zbc of the position of the tool edge TOt on the second line segment SpB-EpB per every rotation of the workpiece W1 may be obtained by: Zbc=ZdB/RevC.

The Z-coordinate Zan of the point An at the n times rotation may be obtained by:

$$Zan = SpAz + n \times Zac \qquad (7)$$
$$= SpAz + n \times (ZdA/RevC)$$

The Z-coordinate Zbn of the point Bn at then times rotation may be obtained by:

$$Zbn = SpBz + n \times Zbc \qquad (8)$$
$$= SpBz + n \times (ZdB/RevC)$$

A line segment An-Bn connecting the points An and Bn have a middle point corresponding to the halfway point origin WpO. The Z-coordinate of the middle point may be represented by: (Zan+Zbn)/2. Vibration of the workpiece W1 in the Z-axis direction at the middle point of the line segment An-Bn may be represented by: {(Zan−Zbn)/2}×cos (θ). Accordingly, the Z-coordinate Znc of the position of the tool edge TOt at the C-axis angle θ at the n times rotation may be obtained by:

$$Znc=\{(Zan+Zbn)/2\}+\{(Zan-Zbn)/2\}\times\cos(\theta) \qquad (9)$$

The NC apparatus 70 may control the Z-coordinate of the workpiece W1 according to the Z-coordinate Znc calculated by the formula (9) and thereby control vibration of the workpiece W1 in association with rotation of the workpiece W1 along the Z-axis. On the first line segment SpA-EpA, the NC apparatus 70 may control movement of the tool edge TOt in association with rotation of the workpiece W1 along the circumference of the imaginary circle C1 on the X-Y plane to vary the positional relationship between the spindle 11 and the tool post 30 by an amount obtained by dividing the length of the first line segment SpA-EpA by the number of divisions N. On the second line segment SpB-EpB, the NC apparatus 70 may control movement of the tool edge TOt in association with rotation of the workpiece W1 along the circumference of the imaginary circle C1 on the X-Y plane to vary the positional relationship between the spindle 11 and the tool post 30 by an amount obtained by dividing the length of the second line segment SpB-EpB by the number of divisions N.

The X-coordinate and the Y-coordinate of the tool edge TOt may be obtained in rotation angle unit (resolution Reso) smaller than a single rotation of the workpiece W1. Moving amount ZdO in the Z-axis direction from the start point origin SpO to the end point origin EpO may be obtained by: ZdO=(ZdA+ZdB)/2. The Z-coordinate of the circular arc center WpC may be equal to the Z-coordinate WpOz of the halfway point origin WpO, which may vary by (ZdO/RevC) per every rotation of the workpiece W1. Accordingly, the Z-coordinate of the circular arc center WpC may vary by (θ/360)×(ZdO/RevC) when the workpiece W1 rotates at the C-axis angle θ. The variation amount (θ/360)×(ZdO/RevC) may be add to the formula (9):

$$Znc=\{(Zan+Zbn)/2\}+\{(Zan-Zbn)/2\}\times\cos(\theta)+(\theta/360)\times(ZdO/RevC) \quad (10)$$

The Z-coordinate WpOz of the halfway point origin WpO may be obtained by:

$$WpOz = SpOz + \{(n/RevC) \times ZdO\} + \{(\theta/360) \times (ZdO/RevC)\} = \quad (11)$$
$$SpOz + \{n'/(ZdO/RevC)\}$$

where the number of times of rotation (n') may be a value obtained by adding (θ/360) to the number of times of rotation (n). The diameter WpD of the protrusion W1p projected on the X-Y plane containing the halfway point origin WpO may be obtained by:

$$WpD=SpD+\{(n'/RevC)\times(EpD-SpD)\} \quad (12)$$

The X-coordinate WpRc of the circular arc center WpC may be equal to the radius (WpD/2) of the protrusion W1p. The circular arc radius WpRr may be equal to the eccentric amount WpE.

The NC apparatus 70 may calculate the Z-coordinate Znc in rotation angle unit (resolution Reso) at the C-axis angle θ at the n times rotation, the X-coordinate WpRc of the circular arc center WpC, and the circular arc radius WpRr. The NC apparatus 70 may control movement of the tool edge TOt in association with rotation of the workpiece W1 along the circumference of the imaginary circular arc (the imaginary circle C1). The imaginary circular arc may have the circular arc radius WpRr around the circular arc center WpC having the X-coordinate WpRc according to the Z-coordinate WpOz of the halfway point origin WpO on the X-Y plane containing the halfway point origin WpO. The NC apparatus may further control movement of the workpiece W1 in association with rotation of the workpiece along the Z-axis to locate the workpiece W1 in the position of the Z-coordinate Znc. As described above, the NC apparatus 70 may control movement of the tool edge TOt in association with rotation of the workpiece W1 along the circumference of the imaginary circular arc (the imaginary circle C1) and further control vibration of the workpiece W1 in association with rotation of the workpiece W1 along the Z-axis to thereby form, on the workpiece W1, the tapered protrusion W1p whose machining start section and machining end section are angled with respect to the X-Y plane. The NC apparatus 70 can control the positional relationship between the spindle 11 and the tool post 30 even if one of the machining start section and the machining end section extends along the X-Y plane.

(5) Exemplary Eccentric Shape Forming Process

Figure 8:
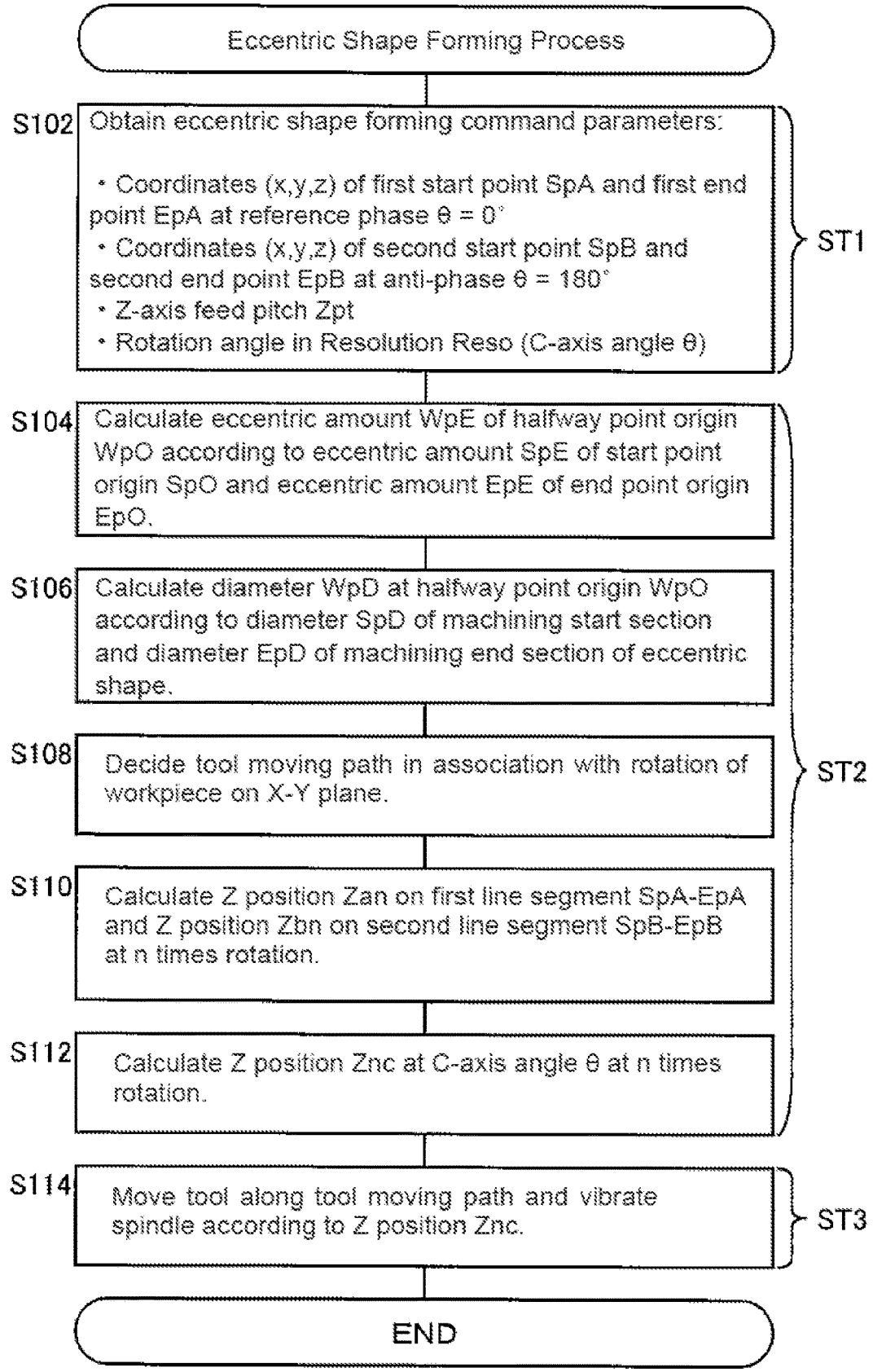
FIG. 8 is a flow chart schematically showing an exemplary eccentric shape forming.

FIG. 8 is an exemplary flow chart of eccentric shape forming process to form the protrusion W1p on the workpiece W1. The NC apparatus 70 in FIG. 2 may receive an instruction at the input 81 to display an eccentric shape forming command creating screen to start the eccentric shape forming process. The NC apparatus 70 may execute an eccentric shape forming method including a moving path deciding method. The eccentric shape forming method may include the following processes (A1), (A2), and (A3) processes:

(A1) First Process ST1 (Step S102): Obtaining the coordinates of the first machining start point SpA and the first machining end point EpA of the protrusion W1p in the reference phase (θ=0°) of the workpiece W1 around the spindle axis AX0 and the coordinates of the second machining start point SpB and the second machining end point EpB of the protrusion W1p in the anti-phase (θ=180°).

(A2) Second Process ST2 (Step S104 to Step S112): Deciding the moving path (the imaginary circle C) of the tool TO1 in association with rotation of the workpiece W1 at least according to the coordinates of the four points (SpA, SpB, EpA, EpB) to thereby form the protrusion W1p around the eccentric axis AX3 passing the start point origin SpO between the first start point SpA and the second start point SpB and the end point origin EpO between the first end point EpA and the second end point EpB.

(A3) Third Process ST3 (Step S114): Moving the tool TO1 along the moving path (the imaginary circle C1) in association with rotation of the workpiece W1.

First, the NC apparatus 70 may obtain the coordinates (x, y, z) of the four points (SpA, SpB, EpA, EpB), the Z-axis feed pitch Zpt, and the C-axis angle θ (resolution Reso) (S102). Specifically, the NC apparatus 70 may obtain the coordinates (x, y, z) of the first start point SpA and the first end point EpA at θ=0° and the coordinates (x, y, z) of the second start point SpB and the second end point EpB at θ=180°. In this embodiment, the eccentric axis AX3 may deviate from the spindle axis AX0 in the X-axis direction and the coordinates (x, y, z) of the four points (SpA, SpB, EpA, EpB) may satisfy the requirements:

$SpAy=SpBy=EpAy=EpBy=0$ $SpAx>SpBx$ $EpAx>EpBx$ $SpAz<EpAz$ $SpBz<EpBz$

Instead, the Y-coordinate (SpAy, SpBy, EpAy, EpBy) may be a value other than 0. Then, the eccentric axis AX3 may deviate in the Y-axis direction. Instead, the X-coordinates (SpAx, SpBx, EpAx, EpBx) may satisfy both (SpAx <SpBx) and (EpAx <EpBx). Then, the reference phase (θ=0°) may be in the −X direction. Instead, the Z-coordinates (SpAz, SpBz, EpAz, EpBz) may satisfy both (SpAz>EpAz) and (SpBz>EpBz). Then, the moving direction of the workpiece W1 may be reversed.

Obtaining the Z-axis feed pitch Zpt may be skipped if it is pre-stored. Obtaining the C-axis angle θ (resolution Reso) may be skipped if it is pre-stored. The NC apparatus 70 may further obtain a circumferential speed (a speed in the circumferential direction) of the workpiece W1 with respect to the position of the tool edge TOt in S102 to control the rotation speed of the workpiece W1 thereby contributing to the life of the tool TO1. Upon at least obtaining the coordinates of the four points (SpA, SpB, EpA, EpB) satisfying the requirements, the NC apparatus 70 may add an eccentric shape forming command to the machining program PR2. The eccentric shape forming command may include at least the coordinates of the four points. The eccentric shape forming command may exclude at least one of the Z-axis feed pitch Zpt and the C-axis angle θ (resolution Reso). Upon reading the eccentric shape forming command from the machining program PR2, the NC apparatus 70 may acquire at least the coordinates of the four points.

The NC apparatus 70 may calculate the eccentric amount WpE of the halfway point origin WpO according to the eccentric amount SpE of the start point origin SpO and the eccentric amount EpE of the end point origin EpO (S104) expecting the protrusion W1p whose machining start section and machining end section are angled with respect to the X-Y plane as shown in FIGS. 6 and 7. The X-coordinate of the start point origin SpO may be obtained by: SpOx= (SpAx+SpBx)/2. The Y-coordinate of the start point origin SpO may be equal to zero (SpOy=0). The Z-coordinate of the start point origin SpO may be obtained by: SpOz= (SpAz+SpBz)/2. Accordingly, the eccentric amount SpE of the start point origin SpO may be equal to: SpOx=(SpAx+ SpBx)/2. The X-coordinate of the end point origin EpO may be obtained by: EpOx=(EpAx+EpBx)/2. The Y-coordinate of the end point origin EpO may be equal to zero (EpOy=0). The Z-coordinate of the end point origin EpO may be obtained by: EpOz=(EpAz+EpBz)/2. Accordingly, the eccentric amount EpE of the end point origin EpO may be equal to: EpOx=(EpAx+EpBx)/2. The Z-coordinate WpOz of the halfway point origin WpO may be obtained by the formula (11). The eccentric amount WpE of the halfway point origin WpO, which may be equal to the X-coordinate WpOx of the halfway point origin WpO, may be obtained by the formula (6).

As described above, the NC apparatus 70 may control interpolating the eccentric amount WpE of the halfway point origin WpO deviating from the spindle axis AX0 according to the eccentric amount SpE of the start point origin SpO and the eccentric amount EpE of the end point origin EpO.

The NC apparatus 70 may calculate the diameter WpD of the protrusion W1p at the halfway point origin WpO according to the diameter SpD of the machining start section and the diameter EpD of the machining end section of the protrusion W1p (S106). Assuming the protrusion W1p whose machining start section and machining end section are angled with respect to the X-Y plane as shown in FIG. 6 and FIG. 7, the diameter WpD of the protrusion W1p at the halfway point origin WpO may be obtained by the formula (4). As described above, the NC apparatus 70 may control interpolating the diameter WpD of the protrusion W1p at the halfway point origin WpO according to the diameter SpD of the machining start section and the diameter EpD of the machining end section of the protrusion W1p.

The NC apparatus 70 may decide the moving path of the tool edge TOt in association with rotation of the workpiece W1 on the X-Y plane (S108). As described referring to FIG. 4, the moving path of the tool edge TOt may extend along the circumference of the imaginary circular arc (the imaginary circle C1) according to the Z-coordinate of the position of the tool edge TOt on the protrusion W1p. The X-coordinate WpRc of the circular arc center WpC may be equal to the radius (WpD/2) of the protrusion W1p according to the Z-coordinate WpOz of the halfway point origin WpO. The circular arc radius WpRr may be equal to the eccentric amount WpE of the halfway point origin WpO deviating from the spindle axis AX0. The NC apparatus 70 may decide the moving path of the tool edge TOt at C-axis angle θ (resolution Reso) on the X-Y plane along the circumference of the imaginary circular arc (the imaginary circle C1) of the circular arc radius WpRr around the circular arc center WpC corresponding to the X-coordinate WpRc.

The NC apparatus 70 may calculate the Z-coordinate Zan on the first line segment SpA-EpA at the n times rotation and the Z-coordinate Zbn on the second line segment SpB-EpB at the n times rotation (S110). The Z-coordinate Zan at the n times rotation may be obtained by the formula (7). The Z-coordinate Zbn at the n times rotation may be obtained by the formula (8).

The NC apparatus 70 may calculate the Z-coordinate Znc at the C-axis angle θ at the n times rotation (S112) by the formula (9) or (10).

The NC apparatus 70 may control movement of the tool TO1 in association with rotation of the workpiece W1 along the X-axis and the Y-axis according to the decided imaginary circular arc (the imaginary circle C1) and control vibration of the workpiece W1 in association with rotation of the workpiece W1 along the Z-axis according to the Z-coordinate Znc to vibrate the workpiece W1 with respect to the Z-axis (S114). The NC apparatus 70 may control varying the positional relationship between the spindle 11 and the tool post 30 on the first line segment SpA-EpA each time the workpiece W1 rotates by an amount obtained by dividing the length of the first line segment SpA-EpA by the number of divisions N. The NC apparatus 70 may control varying the positional relationship between the spindle 11 and the tool post 30 on the second line segment SpB-EpB each time the workpiece W1 rotates by an amount obtained by dividing the length of the second line segment SpB-EpB by the number of divisions N. Accordingly, the NC apparatus may control forming the protrusion W1p on the workpiece W1 around the eccentric axis AX3 deviating from the spindle axis AX0.

As described above, the protrusion W1p on the workpiece W1 may not be limited to a columnar eccentric shape formed around the axis parallel to the spindle axis. The invention provides a variety of eccentric shapes including the tapered eccentric protrusion as shown in FIG. 3, the tapered eccentric protrusion around the eccentric axis AX3 unparallel to the spindle axis AX0 as shown in FIG. 5, and the tapered eccentric protrusion at least one of whose machining start section and machining end section are angled with respect to the X-Y plane as shown in FIG. 6. The embodiment improves freedom in eccentric shape forming.

(6) Modified Embodiments

The invention may be embodied in various modifications. The machine tool of the invention may include a machining center or other machines but the lathe. The lathe 1 may include a lathe of spindle stationary type that the front spindle 16 does not move in the Z-axis direction. The tool post 30 movable in the X-axis and the Y-axis directions may be movable also in the Z-axis direction. The back spindle 21 may hold the workpiece W1 instead of the front spindle 16. The tool TO1 may be favorably a turning tool but may be a stationary tool such as a drill and a rotary tool such as an endmill. The eccentric shape may include a hole opened in a trumpet shape.

The eccentric shape forming process as shown in FIG. 8 may be appropriately modified including a change in the order of the steps. For example, S104 (calculating the eccentric amount WpE) may be replaced by S106 (calculating the diameter WpD). Calculating the diameter WpD may be replaced by calculating the radius (WpD/2) to decide the moving path of the tool TO1. At least part of the steps S102 to S112 may be executed by an external computer.

In S102, the eccentric shape forming command may exclude part of the coordinates of the four points (SpA, SpB, EpA, EpB) from the parameters. For example, the eccentric shape forming command to form a columnar eccentric shape may exclude the coordinates of one of the first end point EpA and the second end point EpB. If the eccentric shape forming command to form a columnar eccentric shape includes a parameter for the Z-axis length of the shape, the command may exclude the coordinates of both of the first end point EpA and the second end point EpB.

In the eccentric shape as shown in FIGS. 3, 5, 6, and 7, the first start point SpA and the first end point EpA are connected by a straight line and the second start point SpB and the second end point EpB are connected by a straight line. Instead, they may be connected by a curved line. The curved first outline connecting the first start point SpA and the first end point EpA may be calculated by a circular arc interpolation. The curved second outline connecting the second start point SpB and the second end point EpB may be calculated by a circular arc interpolation. On the first outline, the NC apparatus 70 may control varying the positional relationship between the spindle 11 and the tool post 30 with respect to the Z-axis by an amount obtained by dividing the moving amount ZdA from the first start point SpA to the first end point EpA by the number of divisions N. On the second outline, the NC apparatus 70 may control varying the positional relationship between the spindle 11 and the tool post 30 with respect to the Z-axis by an amount obtained by dividing the moving amount ZdB from the second start point SpB to the second end point EpB by the number of divisions N. The NC apparatus 70 may control forming the eccentric shape whose first start point SpA and first end point EpA are connected by a curved line and whose second start point SpB and second start point EpB are connected by a curved line.

FIG. 9 is a block diagram schematically showing an exemplary configuration of an electrical circuit of the lathe 1 of a spindle stationary type. The lathe 1 in FIG. 9 may differ from the lathe 1 in FIG. 2 in that the front head stock driver 18 is removed and a Z-axis driver 34 is added to the tool post driver 31. The Z-axis driver 34 may drive the tool post 30 along the Z-axis in accordance with a command from the NC apparatus 70. The tool post driver 31 may drive the tool post 30 along the X-axis, the Y-axis, and the Z-axis. The NC apparatus 70 may control movement of the tool TO1 in association with rotation of the workpiece W1 along the X-axis and the Y-axis and control vibration of the tool TO1 in association with rotation of the workpiece W1 along the Z-axis to vary the positional relationship between the spindle 11 and the tool post 30 with respect to the Z-axis. The NC apparatus 70 may control forming the eccentric shape on the workpiece W1 in the lathe 1 of spindle stationary type.

(7) Conclusion

As described above, the invention may provide a technology improving freedom in eccentric shape forming in various embodiments. The fundamental functions and effects are available even in a technology only comprising elements of independent claims. The elements described in the embodiments may be replaced to each other and any combination of the elements may be changed in the scope of the invention. Any prior art may be replaced with the element described in the embodiments and any combination of the prior art and the element may be changed in the scope of the invention.

What is claimed is:

1. A machine tool comprising:
a spindle rotatable together with a workpiece around a spindle axis;
a tool post holding a tool for use to machine the workpiece;
a driver capable of varying a positional relationship between the spindle and the tool post; and
a controller capable of controlling the driver to form an eccentric shape on the workpiece around an eccentric axis deviating from the spindle axis;
wherein the controller acquires a coordinate of a first machining start point of the eccentric shape in a reference phase of the workpiece around the spindle axis, a coordinate of a second machining start point of the eccentric shape in an anti-phase different from the reference phase by 180 degrees, a coordinate of a first machining end point of the eccentric shape in the reference phase, and a coordinate of a second machining end point of the eccentric shape in the anti-phase,
the controller decides a moving path of the tool in association with rotation of the workpiece at least according to the coordinates of the first machining start point, the second machining start point, the first machining end point, and the second machining end point to form the eccentric shape around the eccentric axis passing a start point origin between the first machining start point and the second machining start point and an end point origin between the first machining end point and the second machining end point, and
the controller controls movement of the tool along the moving path in association with rotation of the workpiece,
wherein the coordinates of the first machining start point, the second machining start point, the first machining end point, and the second machining end point respectively comprise Z-coordinates on a Z-axis extended along the spindle axis, and wherein on a first outline connecting the first machining start point and the first machining end point, the controller controls the driver to vary the positional relationship between the spindle and the tool post with respect to the Z-axis each time the workpiece rotates on the spindle axis by an amount obtained by dividing a difference of the Z-coordinates between the first machining start point and the first machining end point by a number of divisions N and on a second outline connecting the second machining start point and the second machining end point, the controller controls the driver to vary the positional relationship between the spindle and the tool post with respect to the Z-axis each time the workpiece rotates on the spindle axis by an amount obtained by dividing a difference of the Z-coordinates between the second machining start point and the second machining end point by the number of divisions N.

2. The machine tool of claim 1, wherein the controller calculates a diameter (SpD) of the eccentric shape in a direction perpendicular to the spindle axis according to the coordinates of the first machining start point and the second machining start point, calculates a diameter (EpD) of the eccentric shape in the direction perpendicular to the spindle axis according to the coordinates of the first machining end point and the second machining end point, interpolates a diameter (WpD) of the eccentric shape at a halfway point origin between the start point origin and the end point origin on the eccentric axis according to the diameter (SPD) and the diameter (EpD), and decides the moving path of the tool along a circumference of an imaginary circular arc around a circular arc center deviating from the spindle axis according to the diameter (WpD).

3. The machine tool of claim 1, wherein the controller calculates an eccentric amount (SpE) of the start point origin deviating from the spindle axis according to the coordinates of the first machining start point and the second machining start point, calculates an eccentric amount (EpE) of the end point origin deviating from the spindle axis according to the coordinates of the first machining end point and the second machining end point, interpolates an eccentric amount (WpE) of a halfway point origin deviating from the spindle axis between the start point origin and the end point origin on the eccentric axis according to the eccentric amount (SpE) and the eccentric amount (EpE), and decides the moving path of the tool along a circumference of an imaginary circular arc of a size according to the eccentric amount (WpE).

4. The machine tool of claim 2, wherein the controller calculates an eccentric amount (SpE) of the start point origin deviating from the spindle axis according to the coordinates of the first machining start point and the second machining start point, calculates an eccentric amount (EpE) of the end point origin deviating from the spindle axis according to the coordinates of the first machining end point and the second machining end point, interpolates an eccentric amount (WpE) of a halfway point origin deviating from the spindle axis between the start point origin and the end point origin on the eccentric axis according to the eccentric amount (SpE) and the eccentric amount (EpE), and decides the moving path of the tool along a circumference of an imaginary circular arc of a size according to the eccentric amount (WpE).

5. The machine tool of claim 1, wherein the driver comprises a tool post driver capable of moving the tool post in an X-axis and a Y-axis and a headstock driver capable of moving the spindle in a Z-axis where the X-axis and the Y-axis perpendicular to each other is perpendicular to the Z-axis along the spindle axis, and the controller controls movement of the tool in association with rotation of the workpiece along the X-axis and the Y-axis and controls vibration of the workpiece in association with rotation of the workpiece along the Z-axis to vibrate the positional relationship between the spindle and the tool post with respect to the Z-axis in association with rotation of the workpiece.

6. The machine tool of claim 2, wherein the driver comprises a tool post driver capable of moving the tool post in an X-axis and a Y-axis and a headstock driver capable of moving the spindle in a Z-axis where the X-axis and the Y-axis perpendicular to each other is perpendicular to the Z-axis along the spindle axis, and the controller controls movement of the tool in association with rotation of the workpiece along the X-axis and the Y-axis and controls vibration of the workpiece in association with rotation of the workpiece along the Z-axis to vibrate the positional relationship between the spindle and the tool post with respect to the Z-axis in association with rotation of the workpiece.

7. The machine tool of claim 3, wherein the driver comprises a tool post driver capable of moving the tool post in an X-axis and a Y-axis and a headstock driver capable of moving the spindle in a Z-axis where the X-axis and the Y-axis perpendicular to each other is perpendicular to the Z-axis along the spindle axis, and the controller controls movement of the tool in association with rotation of the workpiece along the X-axis and the Y-axis and controls vibration of the workpiece in association with rotation of the workpiece along the Z-axis to vibrate the positional relationship between the spindle and the tool post with respect to the Z-axis in association with rotation of the workpiece.

8. The machine tool of claim 4, wherein the driver comprises a tool post driver capable of moving the tool post in an X-axis and a Y-axis and a headstock driver capable of moving the spindle in a Z-axis where the X-axis and the Y-axis perpendicular to each other is perpendicular to the Z-axis along the spindle axis, and the controller controls movement of the tool in association with rotation of the workpiece along the X-axis and the Y-axis and controls vibration of the workpiece in association with rotation of the workpiece along the Z-axis to vibrate the positional relationship between the spindle and the tool post with respect to the Z-axis in association with rotation of the workpiece.

9. The machine tool of claim 1, wherein the driver is capable of moving the tool post in an X-axis, a Y-axis, and a Z-axis where the X-axis and the Y-axis perpendicular to each other is perpendicular to the Z-axis along the spindle axis, and the controller controls movement of the tool in association with rotation of the workpiece along the X-axis and the Y-axis and controls vibration of the tool in association with rotation of the workpiece along the Z-axis to vibrate the positional relationship between the spindle and the tool post with respect to the Z-axis in association with rotation of the workpiece.

10. The machine tool of claim 2, wherein the driver is capable of moving the tool post in an X-axis, a Y-axis, and a Z-axis where the X-axis and the Y-axis perpendicular to each other is perpendicular to the Z-axis along the spindle axis, and the controller controls movement of the tool in association with rotation of the workpiece along the X-axis and the Y-axis and controls vibration of the tool in association with rotation of the workpiece along the Z-axis to vibrate the positional relationship between the spindle and the tool post with respect to the Z-axis in association with rotation of the workpiece.

11. A method of deciding a tool moving path for the machine tool of claim 1, the method comprising:
  acquiring a coordinate of a first machining start point of the eccentric shape in a reference phase of the workpiece around the spindle axis, a coordinate of a second machining start point of the eccentric shape in an anti-phase different from the reference phase by 180 degrees, a coordinate of a first machining end point of the eccentric shape in the reference phase, and a coordinate of a second machining end point of the eccentric shape in the anti-phase, and
  deciding a moving path of the tool in association with rotation of the workpiece at least according to the coordinates of the first machining start point, the second machining start point, the first machining end point, and the second machining end point to form the eccentric shape around the eccentric axis passing a start point origin between the first machining start point and the second machining start point and an end point origin between the first machining end point and the second machining end point.

* * * * *